US008737989B2

(12) United States Patent
Luft

(10) Patent No.: US 8,737,989 B2
(45) Date of Patent: May 27, 2014

(54) METHODS AND APPARATUS FOR MACHINE-TO-MACHINE BASED COMMUNICATION SERVICE CLASSES

(75) Inventor: Achim Luft, Braunschweig (DE)

(73) Assignee: Apple Inc., Cupertino, CA (US)

( * ) Notice: Subject to any disclaimer, the term of this patent is extended or adjusted under 35 U.S.C. 154(b) by 864 days.

(21) Appl. No.: 12/231,095

(22) Filed: Aug. 29, 2008

(65) Prior Publication Data

US 2010/0057485 A1 Mar. 4, 2010

(51) Int. Cl.
*H04W 4/00* (2009.01)

(52) U.S. Cl.
USPC ............... 455/432.3; 455/410; 455/414.1; 455/418; 455/435.1; 370/338; 379/142.05; 379/142.06; 726/4; 726/5; 726/21; 726/27

(58) Field of Classification Search
USPC ........... 455/411, 410, 405, 414.1, 456.1, 418, 455/426.2, 432.1, 435.1, 466; 726/27, 35, 726/1–21, 26; 370/328–338; 379/142.05, 379/142.06
See application file for complete search history.

(56) References Cited

U.S. PATENT DOCUMENTS

| | | | |
|---|---|---|---|
| 6,597,916 B2 | 7/2003 | Edge | |
| 6,622,016 B1 | 9/2003 | Sladek et al. | |
| 6,766,361 B1 | 7/2004 | Venigalla | |
| 6,925,431 B1 | 8/2005 | Papaefstathiou | |
| 7,448,043 B2 | 11/2008 | Shenfield et al. | |
| 7,801,207 B2 | 9/2010 | Chen | |
| 8,090,347 B2 * | 1/2012 | Santoro et al. | 455/410 |
| 2001/0012787 A1 * | 8/2001 | Wortham | 455/552 |
| 2002/0022474 A1 * | 2/2002 | Blom et al. | 455/410 |
| 2003/0027571 A1 | 2/2003 | Karlsson et al. | |
| 2005/0043011 A1 * | 2/2005 | Murray et al. | 455/405 |
| 2005/0119008 A1 * | 6/2005 | Haumont | 455/456.1 |
| 2005/0282559 A1 * | 12/2005 | Erskine et al. | 455/456.4 |
| 2008/0153488 A1 * | 6/2008 | Ruhanen et al. | 455/435.1 |
| 2008/0153521 A1 * | 6/2008 | Benaouda et al. | 455/466 |
| 2009/0191857 A1 * | 7/2009 | Horn et al. | 455/419 |
| 2009/0217348 A1 * | 8/2009 | Salmela et al. | 726/2 |

OTHER PUBLICATIONS

3GPP TS 23.008 V8.2.0 (Jun. 2008); 3rd Generation Partnership Project; Technical Specification Group Core Network and Terminals; Organization of subscriber data (Release 8) Global System for Mobile Communications.
ITU International Telecommunication Union; ITU-T Q.763 (Dec. 1999); Telecommunication Standardization Sector of ITU; Series Q: Switching and Signalling; Specifications of Signalling System No. 7—ISDN user part; Signalling System No. 7—ISDN user part formats and codes; ITU-T Recommendation Q.763 (Formerly CCITT Recommendation).

* cited by examiner

*Primary Examiner* — Quan M Hua
(74) *Attorney, Agent, or Firm* — Womble Carlyle Sandridge & Rice, LLP

(57) ABSTRACT

Methods and apparatus enabling a wireless network to provide differentiated services to a machine-to-machine (M2M) client. In one embodiment, the wireless network comprises a UMTS network, and the Home Location Register (HLR) entity identifies subscriptions as machine-to-machine (M2M) enabled devices based on flags or other descriptors associated with each M2M device, and imposes one or more rule sets (e.g., service restrictions) based on this identification. The classification of M2M devices within the HLR may optionally include additional capability or profile data for the M2M device (e.g. static, low mobility, low data activity, etc.). Various other network entities may use the M2M identification to modify the delivered data service, so as to optimize network resources. Furthermore, monitoring of M2M client behavior can be used to detect and notify the network operator of abnormal, fraudulent, or malicious activity. Business methods utilizing the aforementioned methods and apparatus are also disclosed.

35 Claims, 11 Drawing Sheets

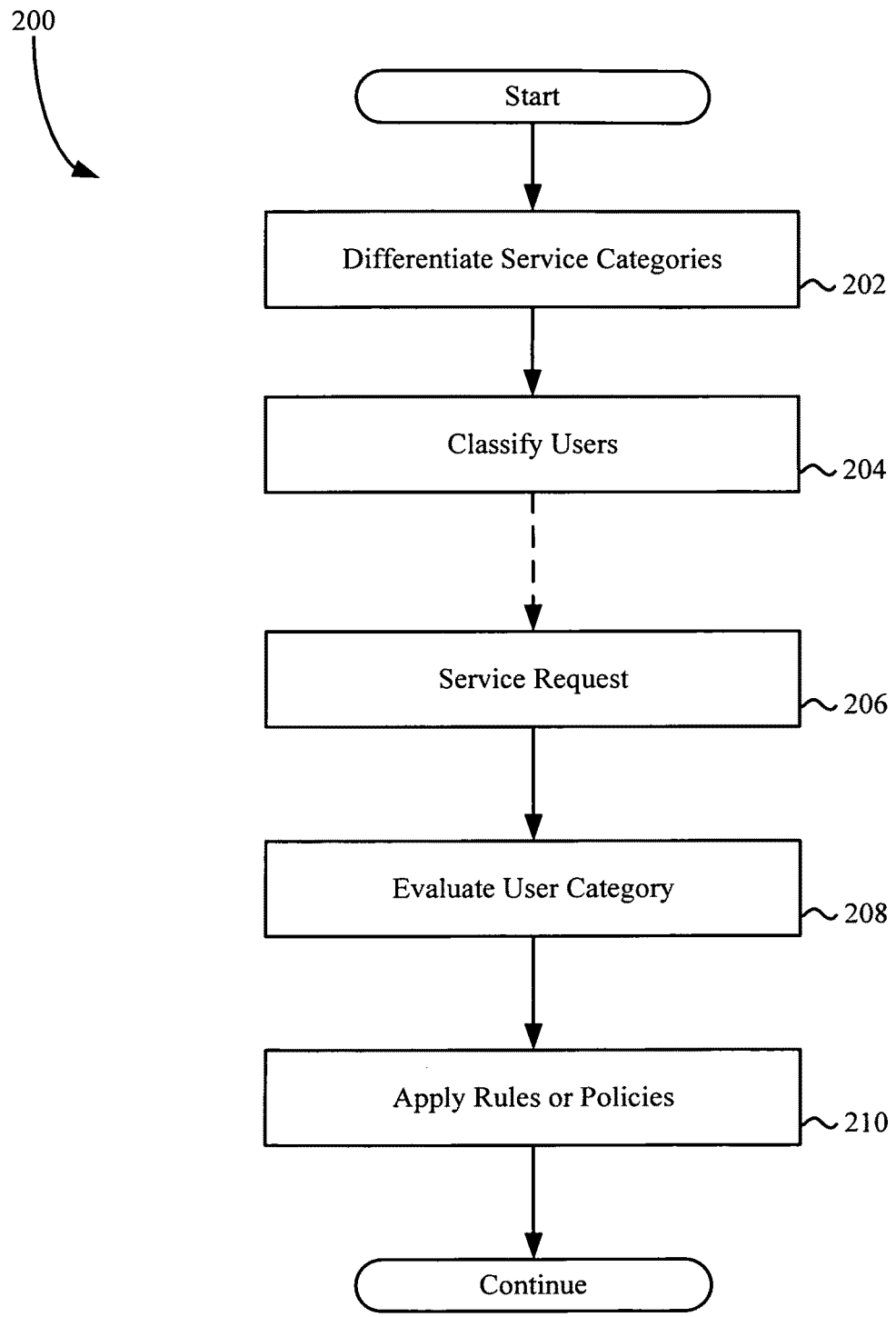

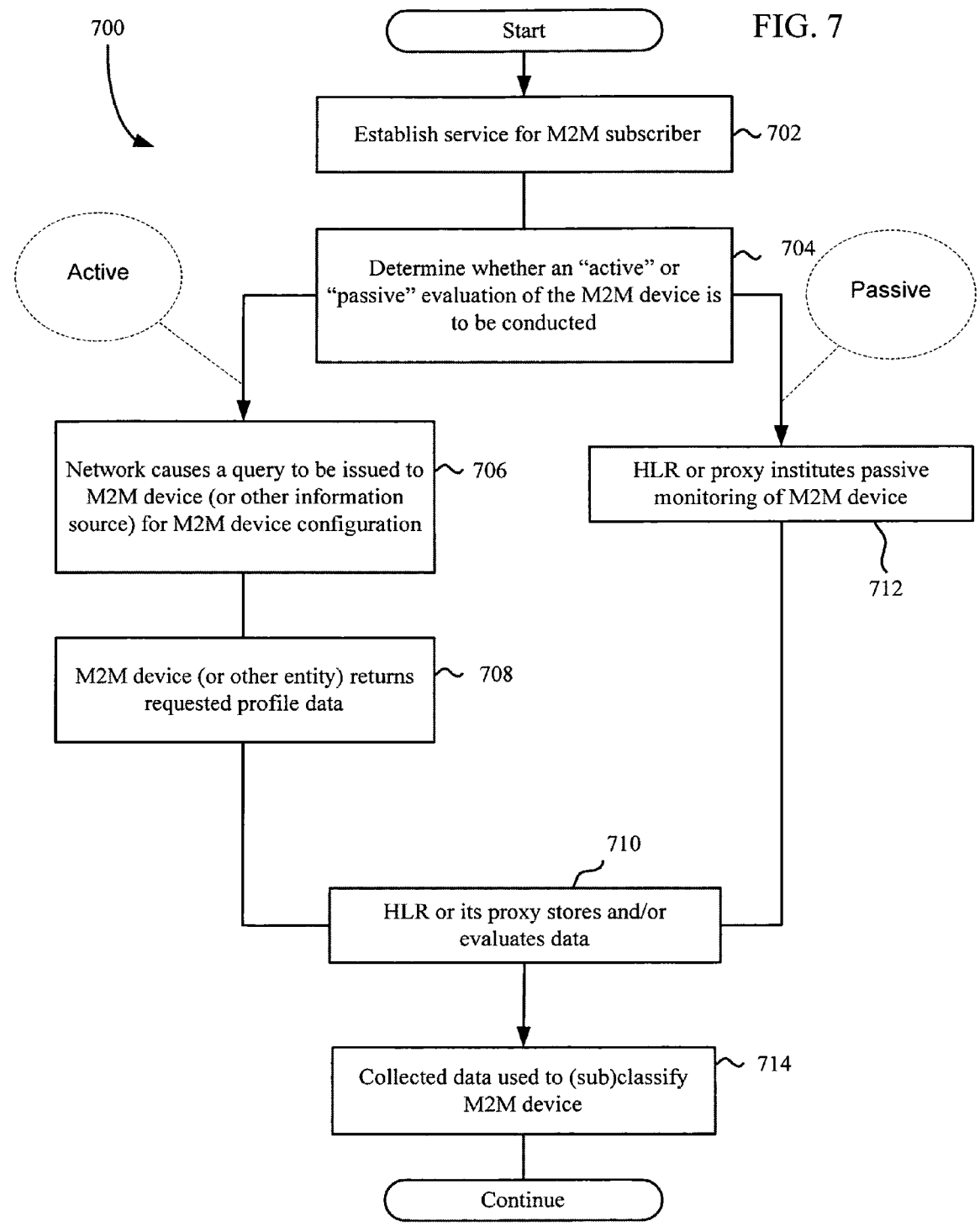

METHODS AND APPARATUS FOR MACHINE-TO-MACHINE BASED COMMUNICATION SERVICE CLASSES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for network identification of a machine-to-machine communications client.

2. Description of Related Technology

Many new applications have begun to emerge with the expansive deployment of cellular network infrastructure. The machine-to-machine (M2M) market is one specific segment that has gained considerable widespread usage. A typical M2M system comprises a device, or group of devices, capable of autonomously replying to requests for data, and transmitting data. An M2M system also may include a communications link to connect the device, or group of devices, to another device (or group of devices), wherein a software agent or process can analyze, report, and/or act upon the requested data.

Typical market segments for M2M devices are shown in FIG. 1a; these market segments comprise e.g., telematics, automation monitoring and control, and supervision. Applications range without limitation from fleet management systems over remote controlling and/or accounting, to health supervision with specific and demanding requirements. In one example, a vending machine for beverages communicates with the owner to automatically order new supplies when it is low. In another example, a rent production machine generates an account of usage and reports it to the rental agency. With such a wide variety of potential applications, the number of such M2M enabled devices is increasing at an unprecedented rate. More than one hundred thirty million (130,000,000) connected devices are expected worldwide before the year 2010. Due to the flexibility and reliability of cellular networks for mobile devices, cellular networks have become a main mode of communication for M2M applications.

M2M clients differ from other ordinary network subscribers primarily with respect to data usage; M2M clients typically are not flexibly programmed; and their software is not written to operate with the wide variety of services that a human subscriber can. Furthermore, many (though not all) M2M services are deterministic in their times of operation, and data transmitted. Therefore, network operators are currently seeking solutions for improving resource management, and/or offering attractive M2M rate structures or tariffs, to meet new business models. It is advantageous for operators of cellular networks to provide a wide range of subscription options to cope with the increasingly diverse M2M use. Ideally, solutions for advanced resource management will take into account periods of low network traffic, and perform load-balancing functions (juggling e.g. time, location and network resources) to optimize network service. Also, methods to implement M2M specific rate structures or tariffs by categorizing access modes, data quantities, and delivery rates for generating various price packages are desirable. The combination of proper resource management and pricing of data will provide a cellular network infrastructure that encourages future M2M application development and deployment.

Mobility Management (MM) is another major component of network administration, as typical mobile devices (e.g., user equipment or "UEs" in a 3G/UMTS network, described in greater detail below) may roam over a large territory. However, unlike a standard subscriber, some installations of M2M clients may move within a small area, or remain temporarily or even permanently within one geographic location. Certain network operations such as Location Area (LA) and Routing Area (RA) updates may be reduced or greatly simplified. The limited mobility of M2M clients can also be used in conjunction with previously mentioned data usage (e.g. limited range telematics, location based automated operation, etc.) as an additional limitation for business model pricing.

In some special use cases, security considerations that differ from standard subscriber usage are necessary for M2M clients. M2M terminals which are placed in unprotected publicly accessible locations may be fraudulently modified or otherwise tampered with. Corrupted terminals may be used to attack the M2M system and/or the cellular network, or facilitate theft of funds or products. Perpetrators of such fraud may target an M2M user (e.g. via denial of service attacks, man-in-the-middle attacks, message blocking, etc.), and/or the Public Land Mobile Network (PLMN) operators (e.g., via theft of service, etc.). Furthermore, unlike personally owned UEs, the unsupervised nature of M2M clients complicates the detection and reporting of fraudulent usage or modification.

Universal Mobile Telecommunications System

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

As is well known, a cellular radio system comprises a network of radio cells each served by a transmitting station, known as a cell site or base station. The radio network provides wireless communications service for a plurality of transceivers (in most cases mobile). The network of base stations working in collaboration allows for wireless service that is greater than the radio coverage provided by a single serving base station. The individual base stations are connected by another network (in many cases a wired network), which includes additional controllers for resource management and in some cases access to other network systems (such as the Internet) or MANs.

In a UMTS system, a base station is commonly referred to as a "Node B". The UMTS Terrestrial Radio Access Network (UTRAN) is the collective body of Node Bs along with the UMTS Radio Network Controllers (RNC). The user interfaces to the UTRAN via User Equipment (UE), which in many typical usage cases is a cellular phone or smartphone. FIG. 1b illustrates an exemplary UMTS cellular system 100 over which M2M services such as those described with respect to FIG. 1a may be provided. The UMTS system 150 comprises a plurality of base station towers 152 (Node Bs)

that are set at various fixed geographic locations. Each of these base station towers 152 are characterized by their respective wireless coverage areas 154. The core network 156 generally governs the operation of the base station towers 152.

Within the UMTS cellular network, an entity called the Home Location Register (HLR—not shown) is a central database contains profile details for each mobile phone subscriber. There is one logical HLR entity per PLMN; however the functionality of the HLR may be spread across co-located or remote multiple servers. The HLR communicates with the Subscriber Identification Module (SIM) within the UE, so as to authenticate and verify that the subscriber is valid (and vice versa). Each SIM card issued by the mobile phone operator has properties which are cataloged within the HLR. The most important entry within the SIM is the International Mobile Subscriber Identity (IMSI), which is the unique key to its corresponding entry within the HLR. The tightly coupled relationship between the SIM card and the HLR, enables the HLR to uniquely identify and provision access control within the UMTS network.

3GPP Specification TS 23.008 V8.2.0 (June 2008), entitled "Technical Specification Group Core Network and Terminals; Organization of subscriber data (Release 8)" which is incorporated herein by reference in its entirety, describes the organization of subscriber data which is stored at the HLR.

As previously mentioned, the IMSI (which uniquely identifies the UE to the HLR) is stored within the SIM card. Also stored within the SIM is the Mobile Subscriber Integrated Services Digital Network (MSISDN) number, which in common parlance is the telephone number, used by the mobile phones to make and receive calls. The primary MSISDN is used for making and receiving voice calls and Short Messaging Services (SMS), but it is possible for a SIM to have other secondary MSISDNs associated with it for fax and data calls.

Per 3GPP TS 23.008, within the HLR a machine specific class, the Location Measurement Unit (LMU) Identifier is defined. The LMU HLR entry is useful for subscription service used for tracking devices; e.g. in a fleet management system. Usually, activated LMUs report their current position in short regular intervals. The messages contain a comparatively small amount of data. This communication behavior is a special case of M2M communication, and other M2M systems may have other requirements regarding their communication characteristics. The LMU feature was originally implemented in Global Standard for Mobile (GSM) Communications, and has carried over to UMTS.

3GPP TS 23.008 also specifies an entry called "Mobile Station Category", but the only valid value of this entry is termed "ordinary subscriber". While, the specification defines data fields related to Operator Determined Barring in the HLR, there are no restrictions to a single or group of fixed Mobile Subscriber Integrated Services Digital Network (MSISDN) numbers for incoming or outgoing connections. Also, subscription restrictions are not M2M-specific. The restrictions only limit roaming ability and the choice of available networks.

The access class of a UE is also written on the Subscriber Identity Module (SIM). The access class can be used to enforce a priority in terms of accessing the network. For example, UEs that belong to members of law enforcement groups have priority over normal UEs. Unfortunately, most access classes are currently indiscriminately distributed and used to randomly load balance. The access class is also less flexible compared with an entry in the HLR, because it is written on the SIM, and therefore not easy to change.

One solution that has been contemplated in the prior art, which relates to M2M restrictions within the core network, is described in U.S. Pat. No. 6,597,916 to Edge issued Jul. 22, 2003 and entitled "Hybrid architecture for supporting location determination in a wireless network". This patent discloses a hybrid system and methods for determining the geographic location of a wireless device. A first base station subsystem is connected to the wireless device for transferring location information to and from the wireless device. A network subsystem is connected to the first base station subsystem and to a location computation entity for transferring location information between the first base station subsystem and the location computation entity. A second base station subsystem is connected to a location measurement entity and to the location computation entity for transferring location information between the location measurement entity and the location computation entity. The location computation entity generates and sends location information to the wireless device and/or location measurement entity and processes location information received from the wireless device and/or location measurement entity to obtain the geographic location of the wireless device.

U.S. Pat. No. 6,622,016 to Sladek, et al. issued Sep. 16, 2003 and entitled "System for controlled provisioning of telecommunications services" discloses methods and systems for controlled provisioning of a desired set of service logic for a subscriber or a group of subscribers. In response to a designated stimulus, such as a time-event, a location-event or a threshold-event, a network entity modifies the subscriber profile maintained by a serving system, so as to include in the profile one or more desired parameters. One such modification may be the inclusion in the profile of a trigger that directs the serving system to query a designated network entity for call handling instructions. The designated network entity may then provide a special set of services for the subscriber or group. Further, a mechanism is provided to help ensure that once such a service overlay is imposed, it remains imposed if desired.

United States Patent Application Publication No. 20030027571 to Karlsson, et al. published Feb. 6, 2003, and entitled "System and method for providing protection from an overload condition within the home location register" that describes a telecommunications system and method for managing congestion within the HLR. At regular intervals or in response to a registration message associated with a mobile station registration request, the HLR can transmit the current load conditions in the HLR to one or more MSC within the area served by the HLR. In response, the MSC can use this load information to reduce the registration intensity in order to protect the HLR from congestion. Each MSC can include one or more HLR load thresholds, and if the current load level in the HLR is above one of these thresholds, the MSC can reduce the number of registration messages sent to the HLR by a certain amount.

Despite the foregoing approaches, the prior art fails to provide an adequate solution for implementing M2M network feature control. More specifically, the prior art affords the operator control over network access, but does not provide adequate features to enable third-party administrative control over its M2M client access.

Accordingly, improved apparatus and methods for third-party control over network access such that the third party administrator can regulate data usage properties (e.g. data throughput, data rate, data origination and destination, etc.) are needed.

Further, business models based on the variable data features of a cellular network, specifically designed for M2M clients is also desirable.

Moreover, such improved apparatus and methods would allow the network to detect, modify and limit usage of service, with respect to other predictable M2M client behaviors related to environmental factors such as the time of day, the location of the device, etc.

Such apparatus and methods would also ideally enable notification of the network operator and/or the third party administrator of unexpected network usage, based on previously determined predictable behavior. Specifically, such improved apparatus and methods would ideally notice unusual behaviors exhibited by an otherwise predictable M2M client to quickly detect fraudulent threats.

SUMMARY OF THE INVENTION

The present invention satisfies the aforementioned needs by providing improved apparatus and methods for wireless device classification and use.

In a first aspect of the invention, a method of operating a wireless network is disclosed. In one embodiment, the method comprises: providing a first user station category; and providing a second user station category; wherein the operator of the wireless network implements a plurality of operating rules which at least partly differ based at least in part on whether a subscriber comprises the first or second user station categories.

In one variant, at least one of the operating rules which differs between the first or second station categories comprises an operating rule restricting the automated apparatus subscriber from performing a location update.

In another variant, the method further comprises: assigning the second user station category to a first automated apparatus subscriber; determining whether the first automated apparatus subscriber has issued a location update request; and identifying the first automated apparatus as being at least potentially subject to service theft.

In a further variant, at least one of the operating rules which differs between the first or second user station categories comprises an operating rule which restricts access to services based at least in part on a temporal parameter; e.g., one which restricts the number or volume of data traffic initiated by a user device within the second category during certain times.

Alternatively, the operating rule comprises one which allows data traffic to be initiated by a user device only during certain prescribed windows of time, or comprises one which restrict data traffic initiated by a user device to a certain maximum per unit time.

In yet another variant, at least one of the operating rules which differs between the first or second mobile station categories comprises an operating rule which restricts generated data traffic to a maximum value.

Alternatively, at least one of the operating rules which differs between the first or second mobile station categories comprises an operating rule which restricts access to a subscriber based on a network traffic parameter; e.g., the network traffic parameter comprises an amount of data traffic in a source cell or a target cell.

In still another variant, the wireless network comprises a UMTS cellular network, the first category comprises an ordinary subscriber category; and the second category comprises an automated apparatus subscriber category.

In another embodiment, the network has a plurality of M2M devices and a plurality of user devices associated therewith, and the method frustrates the theft of services, the method comprising: marking or flagging individual ones of the M2M devices within the network to indicate that they belong to an M2M class; causing the M2M devices to each perform, if required, a location update operation during a prescribed time interval; and monitoring the M2M devices for location updates performed outside of the time interval.

In a second aspect of the invention, a computer readable apparatus comprising a storage medium adapted to store at least one computer program is disclosed. In one embodiment, the computer program which, when executed by a processing device, governs the operation of a subscriber in a wireless network by at least: assigning a first user type to a network subscriber, the first user type comprising one of a plurality of user types which are at least partly different from one another; and implementing a set of operating rules for the network subscriber, the set of operating rules governed at least in part on the assigning of the first user type.

In one variant, the set of operating rules comprises at least one rule that governs the operation of outgoing calls to the network subscriber, and at least one rule that governs the operation of incoming calls to the network subscriber.

In another variant, the set of operating rules comprises an operating rule which restricts access to services based on a time parameter.

In a further variant, at least one of the operating rules comprises an operating rule which restricts generated data traffic to a maximum value. Alternatively, at least one of the operating rules comprises an operating rule which restricts access to a subscriber based on a network traffic parameter; e.g., an amount of data traffic in one of a source cell or a target cell.

In still another variant, at least one of the operating rules comprises an operating rule which restricts data traffic to a fixed amount per a unit of time.

In another variant, the wireless network comprises a cellular wireless network compliant with UMTS, and the first user type comprises a machine-to-machine (M2M) user type. The at least one computer program is configured to for example: access a service or device profile relating to the network subscriber; and implement the operating rules for the subscriber based at least in part on the profile.

In another variant, the aforementioned profile is stored in the network, and is at least partly constructed based on anecdotal observations of the operational patterns of the network subscriber.

In yet another variant, the at least one computer program is configured to cause the network subscriber to perform location updates during one or more prescribed periods of time.

In a third aspect of the invention, apparatus for use in a wireless network is disclosed. In one embodiment, the apparatus comprises: a digital processor; at least one network interface in data communication with the digital processor; and a memory storing at least one computer program, the at least one computer program comprising instructions. When executed by the digital processor, the instructions govern the operation of a subscriber in a wireless network according to the method comprising: reading a user category associated with a wireless network subscriber received via the at least one network interface; determining whether the user category is directed to an ordinary subscriber or an automated subscriber; and implementing one or more operator rules for the wireless network subscriber based at least in part on the act of determining.

In one variant, the network comprises a UMTS wireless network, and the apparatus comprises a home location register (HLR) apparatus.

In another variant, the act of determining comprises determining that the category for the subscriber is directed to an automated subscriber, and the act of implementing comprises implementing at least one rule which is intended to facilitate detection of surreptitious use or service theft on an account of the subscriber.

In a fourth aspect of the invention, a method of regulating network access in a wireless network is disclosed. In one embodiment, the network comprises at least one Machine-to-Machine (M2M) client device and a network entity, and the method comprises: providing a mobile subscriber category identifier to the at least one M2M client that distinguishes the M2M client from an ordinary subscriber; correlating the mobile subscriber category identifier with a unique identifier for the at least one M2M client; receiving an access attempt by the at least one M2M client, the access attempt comprising a request for a network service and the unique identifier; determining the mobile subscriber category identifier based in part on the unique identifier; and permitting or denying access to the wireless network based at least in part on the compatibility of the request for network service with the mobile subscriber category identifier.

In one variant, the unique identifier comprises the at least one M2M client International Mobile Subscriber Identity (IMSI).

In another variant, the at least one M2M client comprises a plurality of M2M clients, the plurality each sharing an identical IMSI.

In yet another variant, the method further comprises: regulating the plurality of M2M clients so that only one of the plurality may utilize the wireless network at any given time.

In a fifth aspect of the invention, a method of detecting unauthorized use of a wireless device within a wireless network is disclosed. In one embodiment, the method comprises: assigning a classification to the device which is different than that for user devices within the network; monitoring the activity of the device according to one or more operating rules, the one or more rules being selected based at least in part on the classification; and based at least in part on the monitoring, implementing one or more actions relating to the device.

In one variant, the assigning a classification comprises assigning a classification indicative of a substantially automated device.

In another variant, the implementing one or more actions comprises terminating or suspending services to wireless device.

In still another variant, the implementing comprises implementing one or more analysis routines against the wireless device.

In a further variant, the monitoring comprises comparing the usage of the network by the wireless device over a period of time to a prescribed usage template established for that particular device.

In a sixth aspect of the invention, a method of doing business in a wireless network is disclosed. In one embodiment, the method comprises: establishing at least two classes of subscribers, a first of the at least two classes comprising a class for users meeting first criteria, and a second of the at least two classes comprising a class for users not meeting the first criteria; and offering a less costly subscription plan to users of the first class. The criteria are such that less network resources are required to service the users of the first class than those of the second class.

In one variant, the first criteria comprise at least one criterion regarding regularity or periodicity of use.

In another variant, the first criteria comprise at least one criterion regarding volume of data transmitted or received per unit time during use.

In yet another variant, the method further comprises requiring at least a portion of the users in the first class to perform location updates only during one or more prescribed periods.

In a further variant, the method further comprises requiring at least a portion of the users in the first class to perform calls or access requests in a patterned fashion so as to optimize network operation.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2 is a logical flow diagram illustrating a generalized methodology for implementing differentiated service classes in a wireless network in accordance with one embodiment of the present invention.

FIG. 7 is a logical flow diagram illustrating a generalized methodology for implementing automatic M2M device capabilities detection within a wireless network in accordance with one embodiment of the present invention.

DETAILED DESCRIPTION OF THE INVENTION

Figure 1A:
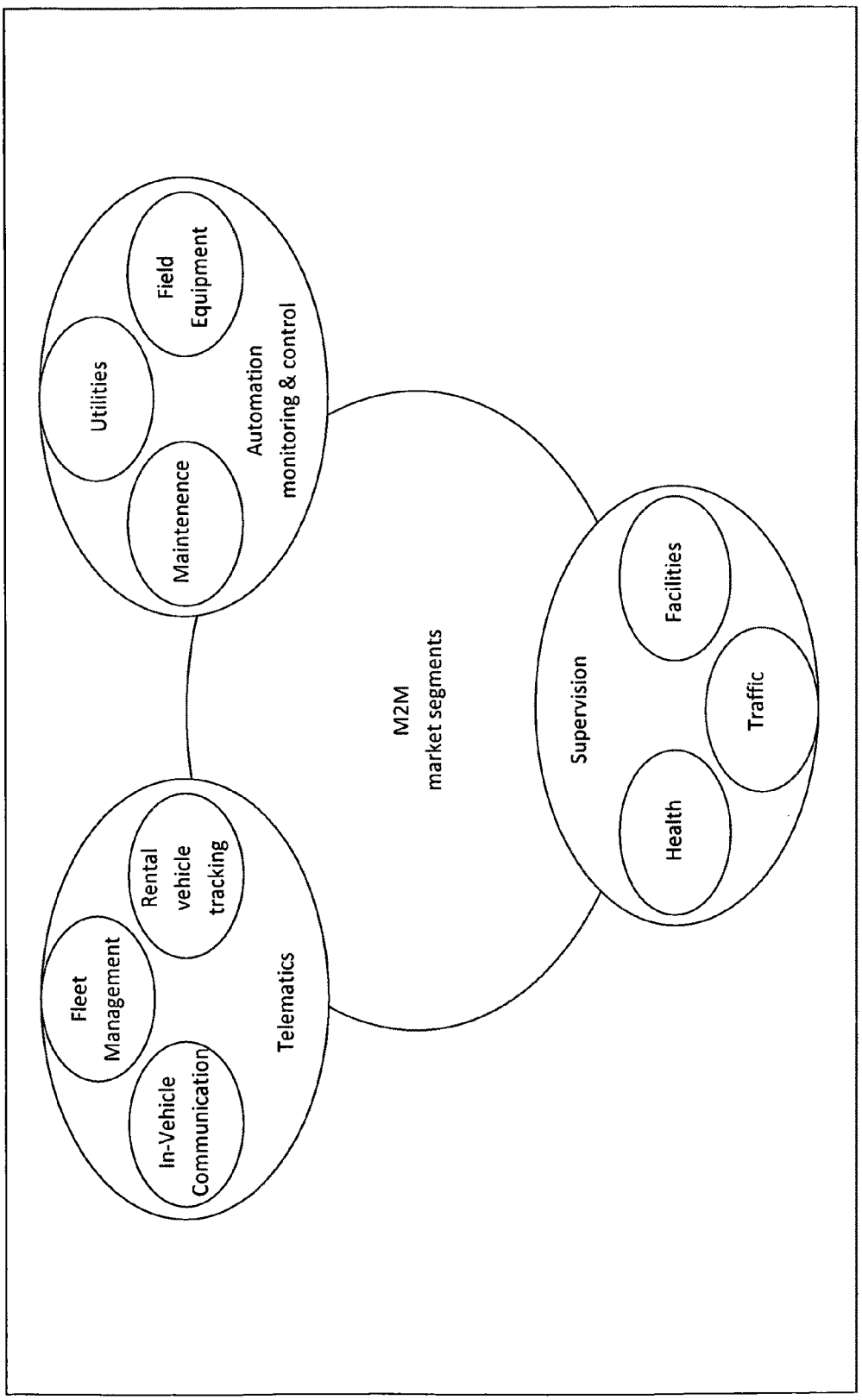
FIG. 1a is a graphical illustration showing various market segments which may be serviced by M2M machine clients under the prior art.
Figure 1B:
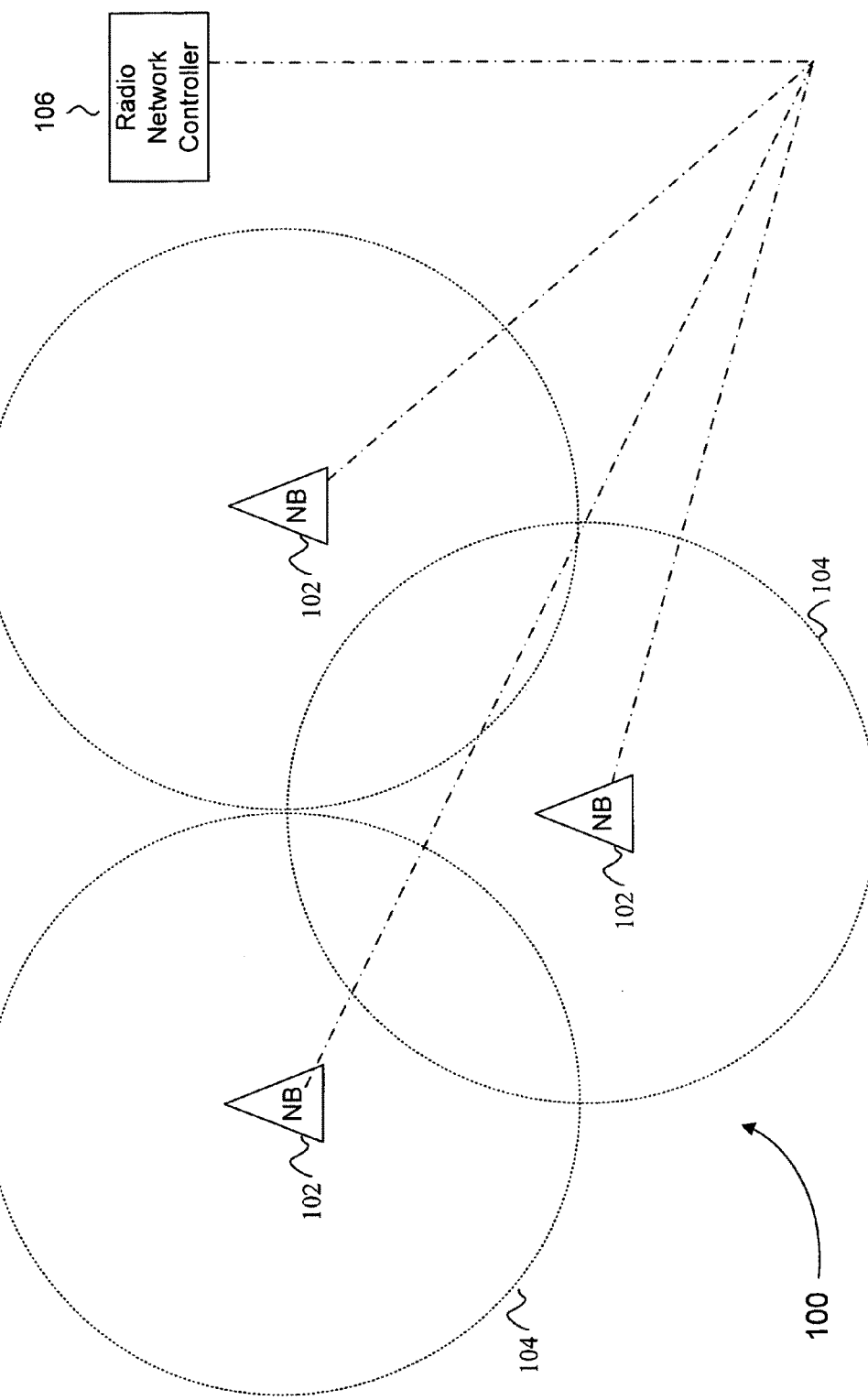
FIG. 1b is a functional block diagram of an exemplary embodiment of a prior art UMTS cellular system over which the M2M services of FIG. 1a may be carried.

Reference is now made to the drawings, wherein like numerals refer to like parts throughout.

As used herein, the terms "client device", "end user device" and "UE" may include, but are not limited to, cellular telephones, smartphones, PCs and minicomputers, whether desktop, laptop, or otherwise, as well as mobile devices such as handheld computers, PDAs, video cameras, set-top boxes, personal media devices (PMDs), M2M-enabled devices or modules, computerized cards or plug-ins, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/ Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IRDA).

Overview

In one fundamental aspect, the present invention provides, inter alia, methods and apparatus that enable the network to service an M2M client using a standard network services provider. In one embodiment, an identifier (e.g., a flag or other indicator) is defined in a network management entity that identifies a given subscription as a machine-to-machine (M2M) enabled device. The identification of an M2M device within the network management entity may optionally include additional descriptive or other data regarding the nature of the M2M device (e.g. static, low-mobility, low data activity, transmit-only, etc.). Various network entities may use the M2M identification to modify the delivered or allowed data service, so as to inter alia optimize network resources. Furthermore, monitoring of M2M client behavior can be used to detect and notify the network operator of abnormal, potentially malicious activity.

By categorizing M2M devices differently than human-operated devices within the network, various benefits can be achieved, including without limitation: (i) the ability of the network operator to optimize the operation of its network; e.g., by scheduling various operations relating to the M2M devices at certain times and/or days (e.g., network access requests, location updates, etc.); (ii) the ability for the network operator to offer better or more economical rate plans to M2M subscribers, based on their generally predictable and low bandwidth network utilization; and (iii) the ability to rapidly detect theft or services, fraud, or other such surreptitious uses of M2M subscriber devices or accounts. The network operator can also place various other operational restrictions on individual M2M devices (or M2M categories/subcategories as a whole) in order to further one or more of the foregoing objectives. For instance, M2M subscribers may be restricted in terms of the types of services that they can be provided over the network, the data rate, the total amount of data transmitted or received, the geographic areas which they can source or target, the number of location updates they can perform, the security or encryption level of the traffic, the QoS associated with the service provided, etc.

In one embodiment of the invention, the aforementioned M2M categorization is used within a 3G (UMTS) wireless network having an HLR (Home Location Register). An improved HLR apparatus including the aforementioned subscriber categorization and operational restriction functionality is disclosed. The HLR apparatus can implement different sets of rules (or rule templates) depending on categorization of a subscriber requesting service, and analyze the allowed services/uses of that subscriber and its operational history/patterns to identify service fraud, theft, or other such activity.

An improved M2M client device architecture (e.g., 3G UE) is also disclosed, wherein the client may be configured to provide profile or capabilities data to the HLR apparatus, implement pre-stored operational templates selected by the HLR apparatus, and dynamically alter its operation based on communication with the HLR.

Methods of detecting fraud or surreptitious use of M2M devices, automatically determining M2M client configuration, and doing business over a wireless network using M2M devices, are also disclosed herein.

Detailed Description of Exemplary Embodiments

Exemplary embodiments of the present invention are now described in detail. While these embodiments are primarily discussed in the context of a UMTS wireless network, it will be recognized by those of ordinary skill that the present invention is not so limited. In fact, the various aspects of the invention are useful in any wireless network, having a central repository of subscriber information; where the network is used for M2M or similar operation.

Moreover, while discussed primarily in the context of data, geography, and/or temporal limitations and access control for M2M clients, it is recognized that other capabilities or subscriber classes may be implemented without departing from the principles of the present invention described herein.

Methods

Referring now to FIG. 2, an exemplary generalized process 200 for implementing differentiated service classes is illustrated.

In step 202, a differentiation of service categories is provided. Each "user" (which may be a human or machine) on the network is classified into one of these categories per step 204.

Per step 206, a user initiates a service request. In response thereto (or previously), the network evaluates the category of the requesting user (step 208), and applies one or more service rules or policies to the request (step 210).

Figure 2A:
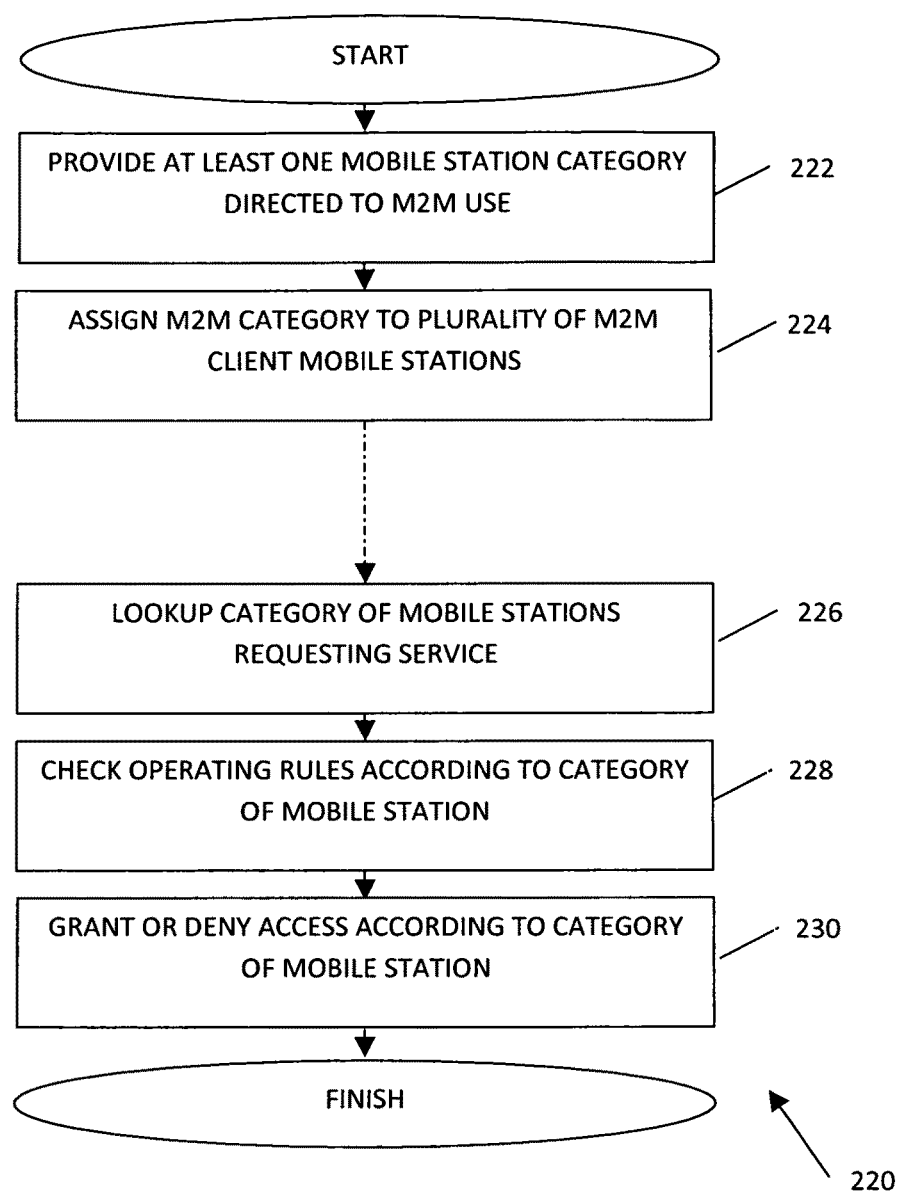
FIG. 2a is a logical flow diagram illustrating an exemplary implementation of the method of FIG. 2.

Referring now to FIG. 2a, one exemplary implementation of the generalized method of FIG. 2 is described in detail.

At step 222 of the process 220, at least one category is provided for human or other "subscribers", and at least one category for M2M clients is provided. In the illustrated embodiment, this categorization provides a setting or means for setting a limit on operational access for the mobile subscriber (e.g. data volume, date/time accessibility, territory, incoming/outgoing calls, etc.). In one exemplary variant, a UMTS cellular system defines two service categories: an "ordinary subscriber" and an "M2M subscriber", although it will be recognized that different classification schemes (including those with three or more classes or sub-classes thereof) may also be utilized consistent with the invention.

At step 224, for each mobile subscriber, at least one category from step 222 is assigned to each mobile subscriber, and this categorization is stored at a central database. The central database stores the category(s) assigned to each user through the use of e.g., a unique identifier or other mechanism. Specifically, in the aforementioned embodiment, the central database (e.g. HLR) stores an assigned category (e.g. ordinary subscriber, M2M subscriber) corresponding to a unique identifier for each UE (e.g. an IMSI). Other approaches may be used however, such as where the UE is configured and required to transmit its classification data upon each service connection or request.

At step 226, when one of the plurality of mobile subscribers requests network access, the mobile subscriber's identity is used to reference the mobile subscriber's corresponding category. The central database cross-references the requesting UE's unique identifier with its internal registry of UE categories, to determine if the UE is an "ordinary subscriber" or an "M2M subscriber".

At step 228, the central database verifies that the mobile subscriber requesting network access is valid, and checks the operating rules that apply to the device. An invalid access attempt may be flagged for logging by the network operator, or may be prohibited. For M2M clients, the central database also determines if the client is requesting appropriate services. This may be accomplished by accessing a stored services record for that device, which lists the permissible services.

At step 230, the requested services are granted or denied based on the operating rules evaluated in step 226, and the referenced device category is distributed to other relevant network entities, causing these corresponding network entities to modify or limit their service to the corresponding UE. The central database distributes the mobile subscriber's category, and accompanying supplemental information (if any) to service switches and gateways. In one embodiment, within a UMTS system, the HLR distributes the corresponding UE's category and supplemental information to corresponding Mobile Switching Centers/Visitor Location Registers (MSCs/VLRs) and Serving GPRS (General Packet Radio Service) Support Nodes (SGSNs), the corresponding MSC-NVLR, and/or SGSN further controlling the Radio Access Network (RAN).

Exemplary UMTS Implementation

The following example further illustrates the usage of M2M subscriber categories according to the present invention in the context of one exemplary UMTS-based implementation.

Figure 3:
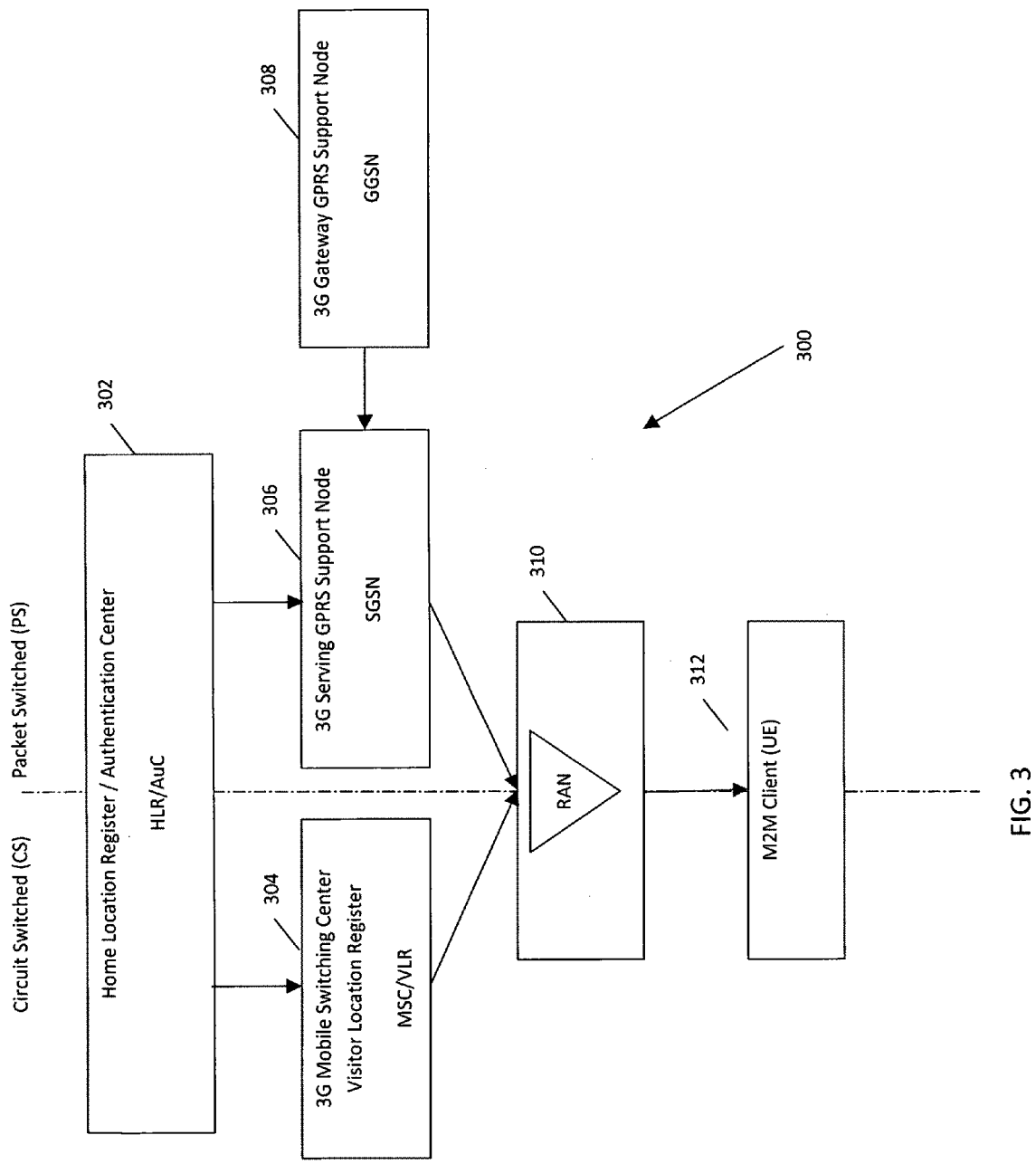
FIG. 3 is a simplified logical diagram of an exemplary UMTS cellular system/M2M client interaction in accordance with the principles of the present invention.

Referring now to FIG. 3, a simplified structure of the UMTS Core Network 300 is illustrated. Access and authorization control of User Equipment (UE) 312 in accordance with the present embodiment is governed primarily by the Home Location Register/Authentication Center (HLR/AuC) 302. The UMTS Core Network comprises a dual Circuit Switched (CS) Network via the MSCIVLR(s) 304 and Packet Switched (PS) Network via the SGSN(s) 306 to provide various types of service to the UE. Also shown is the Gateway GPRS Support Node (GGSN) 308, which provides Packet Data access to external networks. The Radio Access Network (RAN) 310 is comprised of Radio Network Controllers and base stations (NodeBs) and is responsible for maintenance of radio resources.

The subscriber profile is defined within the relevant specification (3GPP TS 23.008, previously incorporated by reference herein). The Mobile Station Category is considered permanent subscriber data, and is stored in the HLR. The Mobile Station Category is disseminated to the Visitor Location Register(s) (VLR(s)) and Serving GPRS Support Node(s) (SGSN(s)) for use in call and data processing.

The Mobile Station Category has a structure defined in ITU-T Recommendation Q.763 entitled "SIGNALLING SYSTEM NO. 7: ISDN USER PART FORMATS AND CODES" (December 1999), which is incorporated by reference herein in its entirety. According to Q.763, an indication referred to as "Called Party's Category" is supported and assigned per IMSI. As presently defined, the Called Party Category Indicator has 256 possible values represented with eight (8) bits. The enumerated values are defined in Table 1:

TABLE 1

| Code | Description |
| --- | --- |
| 1. 00000000#b | calling party's category unknown at this time |
| 2. 00000001#b | operator, language French |
| 3. 00000010#b | operator, language English |
| 4. 00000011#b | operator, language German |
| 5. 00000100#b | operator, language Russian |
| 6. 00000101#b | operator, language Spanish |
| 7. 00000110#b ... 00001000#b | (available to Administrations) |
| 8. 00001001#b | reserved (see ITU-T Recommendation Q.104) |
| 9. 00001010#b | ordinary calling subscriber |
| 10. 00001011#b | calling subscriber with priority 26 ITU-T Q.763 (December 1999) |
| 11. 00001100#b | data call (voice band data) |
| 12. 00001101#b | test call |
| 13. 00001110#b | spare |
| 14. 00001111#b | payphone |
| 15. 00010000#b ... 11011111#b | spare |
| 16. 11100000#b ... 11111110#b | reserved for national use |
| 17. 11111111#b | Spare |

In one exemplary embodiment of the present invention, a new value "M2M subscriber" is introduced, which can take on a plurality of values analogous to those for "Called Party's Category" above.

In a typical UMTS cellular system, the HLR takes appropriate measures to restrict service for the mobile station within an MSC or SGSN. Such restrictions may take any number of different forms, including restrictions on e.g., (i) setting and sending network messaging to the UE, (ii) MSC and SGSN controlling the available services, features or phases, and (iii) barring programs or roaming restrictions for the MSC or SGSN area. However, a typical human-operated (i.e., non-M2M) UE may opt to contact any other UE, while an M2M client may not require this capability.

As disclosed within the 3GPP 23.008 previously incorporated herein, the settings for "barring of outgoing calls" controlled by the HLR include: (i) no barring of outgoing calls; (ii) barring of all outgoing calls; (iii) barring of all outgoing international calls; (iv) barring of all outgoing international calls except those directed to the home PLMN country; (v) barring of all outgoing inter-zonal calls; (vi) barring of all outgoing inter-zonal calls except those directed to the home PLMN country; and (vii) barring of all outgoing international calls except those directed to the home PLMN country AND barring of all outgoing inter-zonal calls.

Therefore, in one exemplary embodiment of the invention, a new setting for the "barring of outgoing calls" would be added; e.g., (viii) "barring of all outgoing calls except those within an outgoing exception list."

These settings for "barring of outgoing calls" comprise permanent data, and in the exemplary UMTS network are stored conditionally in the HLR, the SGSN and the VLR. According to the principles of the present invention, a new value restricts outgoing calls to a single or group of targets. The new outgoing exception list according to this embodiment contains the accessible targets, and is permanent data stored in the HLR and/or the VLR.

Likewise, the settings for "barring of incoming calls" controlled by the HLR includes: (i) no barring of incoming calls; (ii) barring of all incoming calls; (iii) barring of all incoming calls when roaming outside the home PLMN country; and (iv) barring of all incoming calls when roaming outside the zone of the home PLMN country. According to the present embodiment, a new setting is added; i.e., "barring of all incoming calls except those in an incoming exception list."

As with the "barring of outgoing calls", this new incoming call setting is permanent data, and is stored in the HLR. The new incoming exception list according to this embodiment also contains the MSISDNs of the subscriptions that are allowed establish a connection to this MS, and is permanent data stored in the HLR and/or the VLR.

Furthermore, 3GPP TS 23.008 further defines subscription restrictions which indicate whether or not certain restrictions apply to a given subscription. The parameter may take any of the following values, including: (i) accessible area for service; (ii) all GSM PLMN(s); (iii) one national and all foreign GSM PLMN(s); (iv) regionally restricted (part of a GSM PLMN in one country); and (v) regionally restricted plus all other GSM PLMN(s).

New settings enabled for M2M operation include under one embodiment of the invention (and without limitation): (i) accessible date/time for services; (ii) data volume restricted; (iii) traffic volume restricted; and (iv) data amount restricted. Each of these settings is described in greater detail below.

As with both outgoing and incoming call barring, the subscription restriction is in the illustrated embodiment a permanent piece of subscriber data, and is stored in the HLR.

According to the invention, new values for this parameter are introduced. "Accessible date/time for services" restrict the access to services to be used only at certain days, and/or certain times of a day. The value "data volume restricted" restricts the generated data traffic to a maximum value as measured by the network.

The value "traffic volume restricted" restricts the subscriber to use services only if the network traffic (either the entire traffic, or the traffic in the source cell, or the traffic in the target cell, as applicable) is below a certain value.

The value "Data Amount restricted" restricts the subscriber to a maximum data amount per message, for a specific period (e.g. an hour, a day or a month).

A wide variety of possible M2M client varieties may be created by combining the new values for "Accessible date/time for services" with the prior art parameters for subscription restriction (e.g. accessible area for service, all GSM PLMN(s), etc.). According to the present invention, different values may be combined or concatenated together to form composite restrictions for use with respect to M2M devices; e.g. restriction of the accessible area AND the accessible date/time, and so forth. Thus, any combination of data, time and location restrictions can be utilized to limit the operation of an M2M client.

In another aspect of useful M2M client limitation, an M2M client may only operate within a specific geographic territory. Based on the network management registry and corresponding M2M client profile, the M2M client's geographical territories are distributed from the network management entity to the corresponding limited range of radio access network to control and monitor terminal access. Furthermore, the individual or group of terminal types will not perform any periodic location updates, and optionally only sporadic location updates due to movement between allowed geographical areas. An exemplary embodiment of a low mobility M2M terminal would be a portable Automated Teller Machine (ATM) used for temporary/semi-temporary venues.

In yet another aspect of a useful M2M client limitation, multiple M2M clients use the same subscriber identity within the network, provided that the plurality of M2M clients only uses the subscriber identity in a non-overlapping fashion. To enable multiple subscribers to use the same identity within the network, the network policies may require that when an M2M client call is requested, all multiplexed M2M clients automatically request verification at a centralized registry. In one exemplary embodiment of a multiplexed M2M subscriber, all M2M enabled devices of a fleet management system could communicate with the same Mobile Subscriber Integrated Services Digital Network (MSISDN); the central registry ensures that only one device at a time is connected to the network.

Exemplary Use Case: Automated Oil Pump Stations

In one exemplary embodiment illustrating the advantages of an M2M system according to the present invention, an M2M-enabled oil pump maintenance system 400 is now described. It will be appreciated that an almost limitless number of different applications may be used consistent with the present invention, including without limitation those for manufacturing or process control, vending machines, ATM machines, infrastructure, transportation systems, power plants, vehicle fleet management, healthcare, national defense and security, and so forth.

Figure 4:
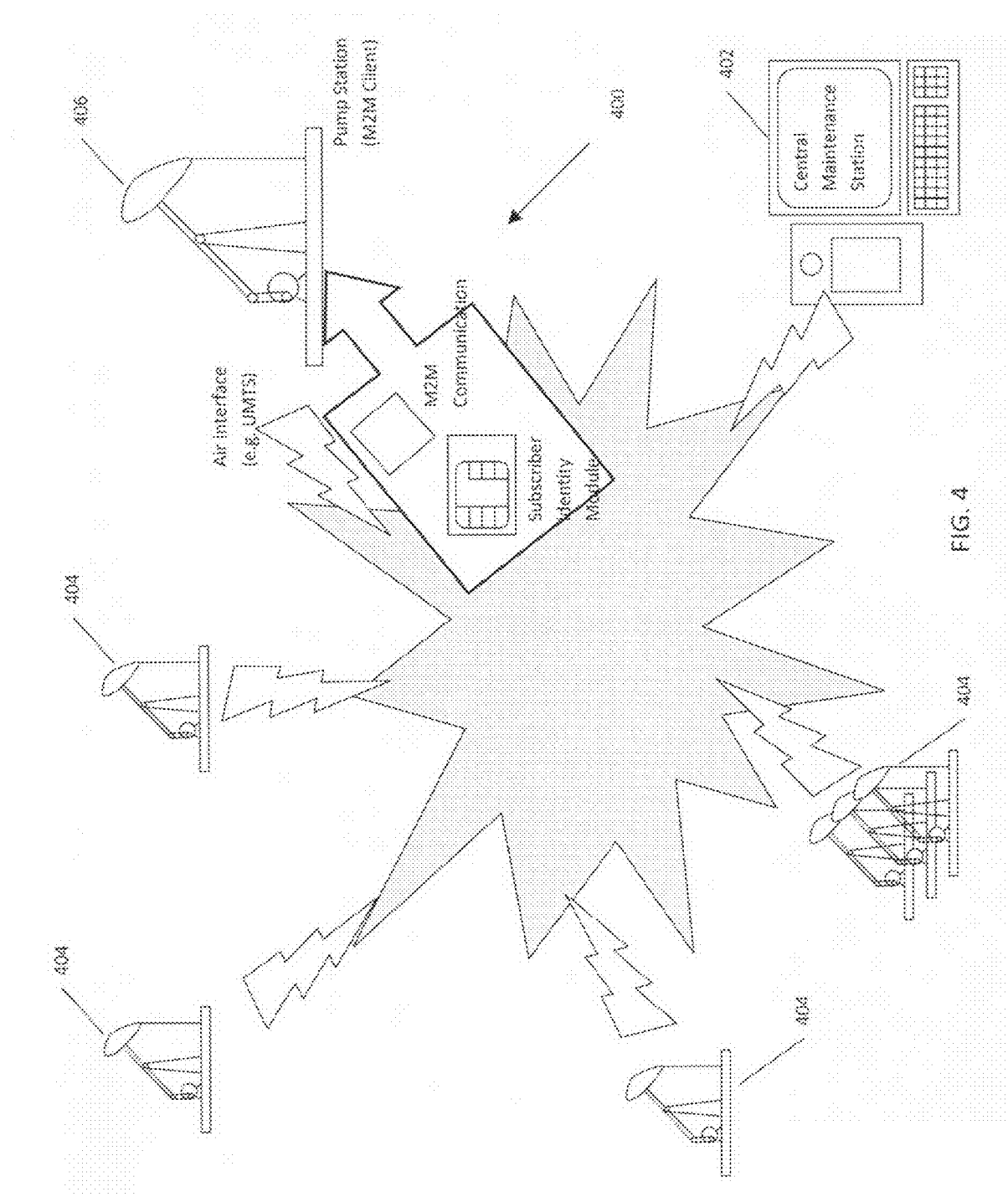
FIG. 4 is graphical representation of an exemplary automated oil drilling site (pump) control system utilizing the M2M client in accordance with one embodiment of the present invention.

In the example of FIG. 4, a hypothetical mining company has several oil pump stations 404 distributed over a given country (or the world). They desire to set up an M2M system with all pump stations as clients 406, and an M2M center 402 that analyzes the output of each pump station. The pump stations often work unattended from human beings. Software intelligence monitors and supervises the integrity and correct function of the stations to inform a human supervisor in case of abnormal behavior. Therefore, the M2M center needs daily (or more frequent) data that is collected from the pump stations; this is especially true since loss of output from any one or more of these pumps can have significant financial impact on the operator.

The automated pump station provides a somewhat ideal example, as the data usage of the M2M reporting interaction remains relatively low (low bandwidth required to support the calls) and highly periodic, and the pumps do not move over time. No voice or other ancillary services are required. Furthermore, the pump stations 404 are unattended, and therefore a threat that a fraudster uses the communication device (or just the subscription) to steal services such as voice calls from the network operator exists. The incoming and outgoing calls for the M2M interactions are also fixed between the oil pump's M2M client 406 and the central maintenance station 402.

Due to the aforementioned extremely limited and predictable operation of such automated pump station interactions, the owner of the M2M system is more interested in a reasonable subscription fee per client device than in all the flexibility an operator offers a normal (human) subscriber. Therefore, the network operator offers the pumping company special M2M subscriptions for their pump stations that restrict the network usage to the minimum that is needed for the M2M maintenance purpose; i.e., low-bandwidth highly periodic communications with no ancillary features, and an incoming and outgoing call exception list. Theft of services can also be readily detected in such cases, since the operation of the M2M device is so predictable and regimented; any deviation from this well-defined pattern or use outside the exception lists could be indicative of such fraud.

In the exemplary embodiment of FIG. 4, the Mobile Station Category is set to "M2M subscriber" for the pump monitoring M2M device. The "M2M subscriber" further references a series of parameters referenced by IMSI.

One parameter ("Barring of outgoing calls except those in outgoing exception list"), indicates that no outgoing call is allowed, except to members of the outgoing exception list. The outgoing exception list contains the MSISDN of the central M2M maintenance system as single entry. The pump stations M2M clients 406 are only allowed to call the M2M central control station 402.

Likewise, the parameter "Barring of incoming calls except those in incoming exception list" accordingly indicates that no incoming call is allowed at all, except from members of the incoming exception list. The incoming exception list contains the MSISDN of the central M2M maintenance system 402 as single entry. Filtering incoming calls to the M2M clients 406 in the network advantageously limits the usage requirements for network resources for the network operator, and mitigates the threat of service theft and Denial-of-Service attacks via the operator's network.

Lastly, for the purpose of more efficient network resource management, some additional subscription restrictions are added in the HLR. The time period during which an M2M client is allowed to establish a connection, is restricted to periods correlated with low network traffic caused by human subscribers (e.g. night time). In one variant, rather than restrict network access time periods, connection establishment could be denied, if a certain traffic volume in the network is exceeded. The restriction could be related to the load in the access cell, the target cell or the entire network load. Under such a case, the M2M device might be programmed to retry its access at a later time (e.g., according to a pseudo-randomized backoff interval approach of the type well known in the digital communication arts), or other such multiple access approach. Alternatively, the M2M could be placed in a temporary "sleep" state until a communication is received from the network indicating that traffic volume (or another metric of interest) has returned to an acceptable value for access by the M2M device. Myriad other schemes may be used with equal success.

Limitations on incoming and outgoing calls, data rates, and/or time periods are unique to M2M clients (as a class); a human subscriber would readily recognize the difference in quality of provided service. These limitations on M2M clients are functionally insignificant, and generally do not detract from the oil pump operator's cellular "experience". Specifically, a call may simply take longer to complete (due to lower data rate), or may occur at a later time than originally attempted, neither of which are typically of any consequence to M2M applications.

Furthermore, as previously noted, violations of these limitations are readily detected and lend themselves to automated detection (e.g., via computer program) as well. As one example, a fraudster trying to connect a call using service stolen from an automated oil pump will be quickly recognized by the network operator's monitoring algorithms. As another example, an oil pump which transfers large amounts of data would also preemptively trigger an error condition as well, as the oil pump IMSI has a total data limitation. These restrictions may be monitored by the network operator to enforce compliance, and to quickly notify the network operator of abnormal, and/or malicious network usage, thereby allowing for rapid termination of the surreptitious service (or other action, such as alerting law enforcement). Depending on the type of facility, such surreptitious use may even be indicative of terrorist activity; e.g., where the components/systems/infrastructure being served by the M2M device are of critical nature or are important to national security.

Exemplary Network Apparatus

Figure 5A:
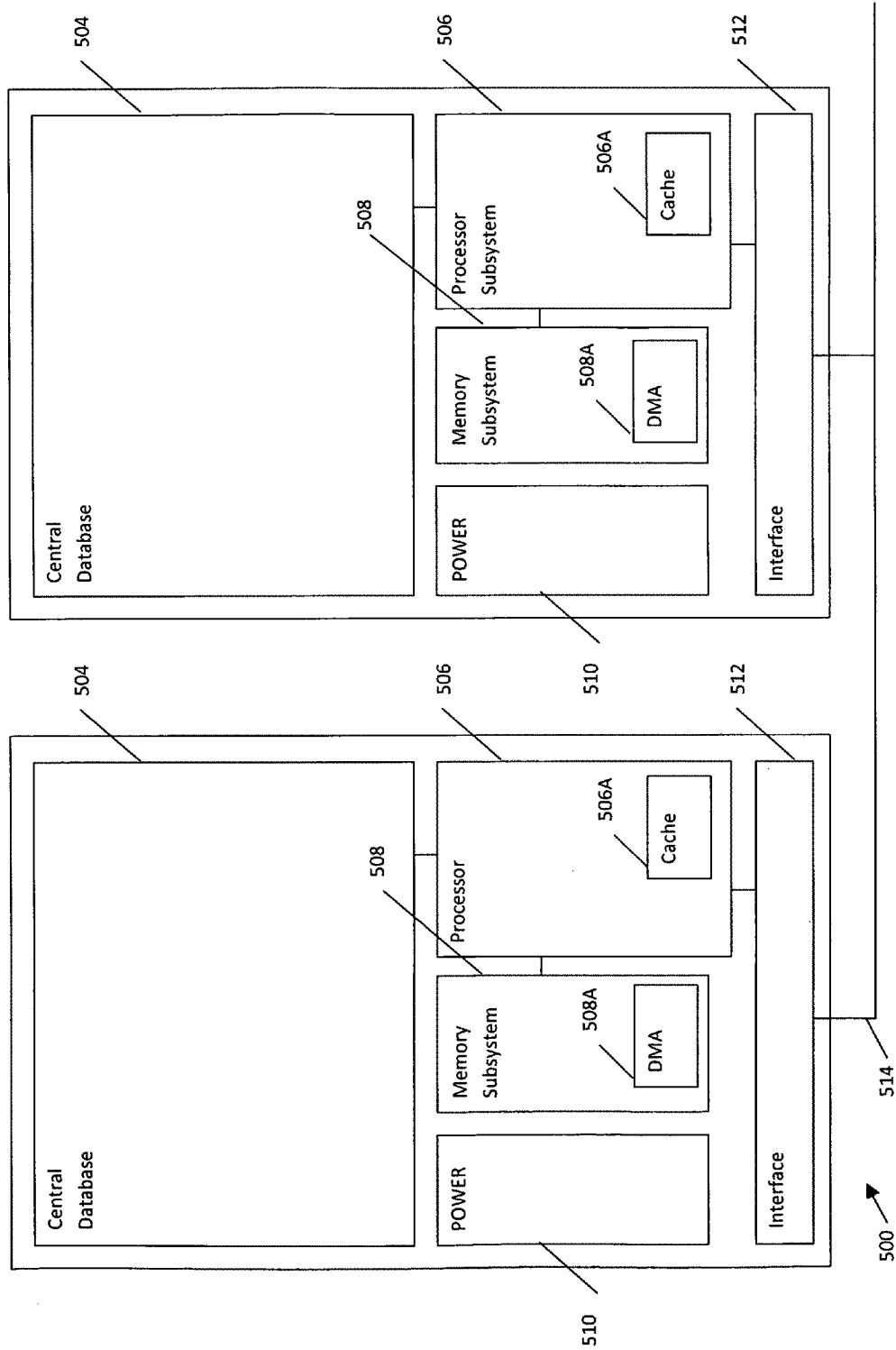
FIG. 5a is a block diagram of an exemplary Home Location Register implemented with a serving computer according to one embodiment of the invention.

Referring now to FIG. 5a, an exemplary central database server subsystem 500 useful in implementing the methods of the present invention is illustrated. The apparatus disclosed comprises, inter alia, a server structure such as a computer, or plurality of computers, logically connected to form a larger network entity.

The apparatus 500 comprises one or more server units comprising a central database 504, processor 506, operational memory 508, power 510, and external network interface 512. The server units are connected by an external bus 514.

As shown, the central database 504 may be divided among many individual machines, but remain one logically coherent database. The central database comprises a listing of unique identifiers, validation algorithms, and corresponding subscription restrictions stored to computer readable media (e.g., hard disk drives/RAID arrays, Flash memory, etc.).

The processor subsystem 506 may be a microprocessor, digital signal processor, field-programmable gate array, or plurality of processing components. The processing subsystem may also comprise an internal cache memory 506A. The processing subsystem is connected to the logical central database 504, a memory subsystem 508, and an external network interface 512.

The memory subsystem 508 may be one or more memory components which may for example, comprise non-volatile (e.g. ROM, FLASH, etc.), and volatile (e.g. RAM, DDR-RAM, QDR-RAM, etc.) components. The memory subsystem may also comprise DMA type hardware 508A, so as to facilitate data accesses.

The illustrated power management subsystem (PMS) 510 provides power to the server unit, and may comprise an integrated circuit and or a plurality of discrete electrical components.

A fail-over or redundant system (including an uninterruptible power supply, or UPS, not shown) may also be utilized for backup if desired.

The illustrated apparatus may also be placed in direct or indirect data communication with other such apparatus (e.g., other HLR assets of the network operator) so that changes to a subscriber's account and profile(s) can be readily propagated across the network as a whole (or even to other types of networks).

Exemplary UE Apparatus

Figure 5B:
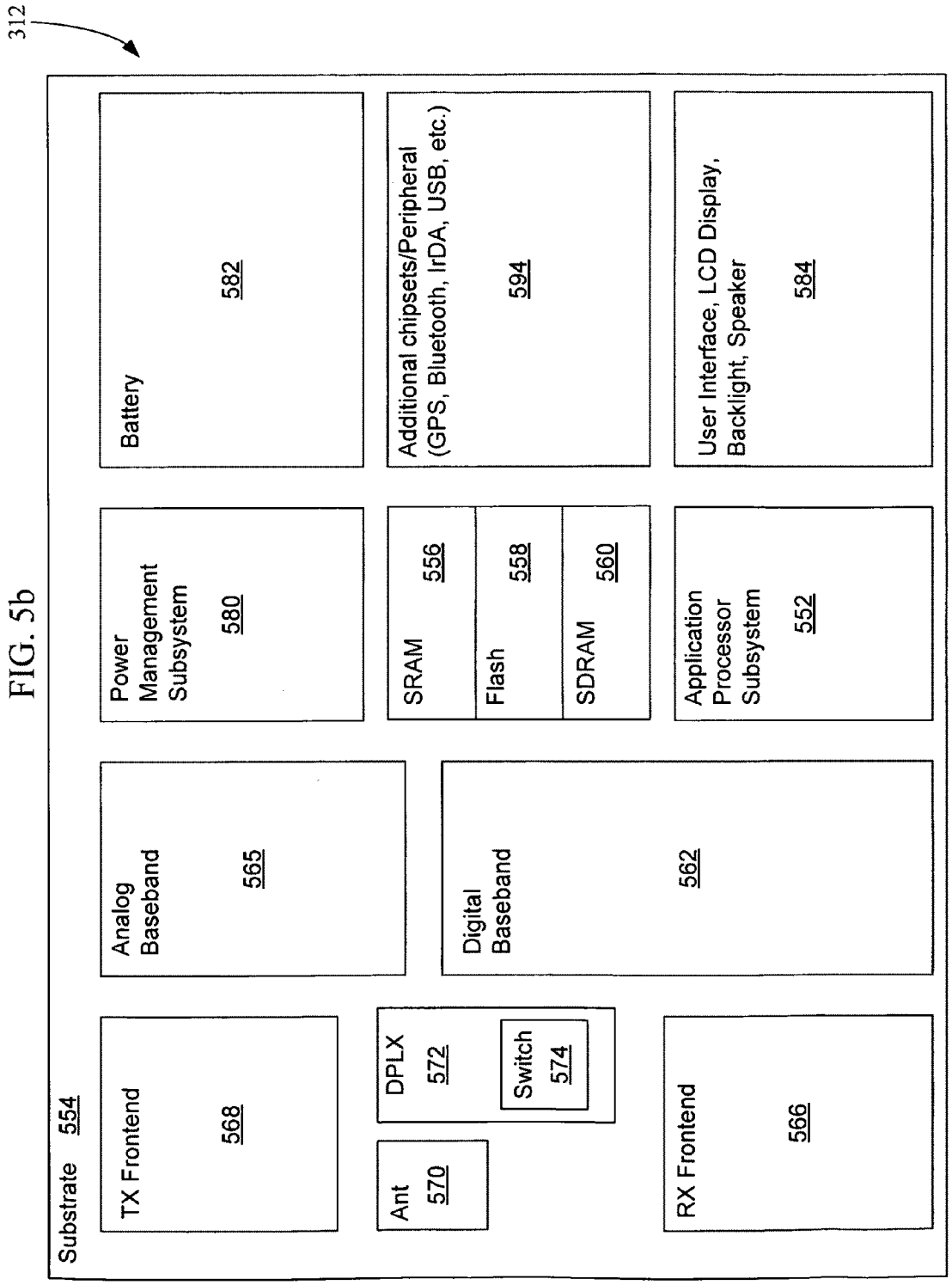
FIG. 5b is a block diagram of an exemplary M2M client device (e.g., 3G UE) implemented according to one embodiment of the invention.

Referring now to FIG. 5*b*, exemplary M2M client (e.g., 3G UE) apparatus 312 useful in implementing the methods of the present invention are illustrated. The apparatus disclosed comprises, inter alia, a UE such as a fixed or portable computerized device capable of at least transmitting or receiving data over the wireless network (e.g., UMTS cellular network in one embodiment). The restriction, categorization, and capabilities profiling functionality described elsewhere herein may be performed to varying degrees within the client 312 as desired, and such functionality is preferably performed in software, although firmware/hardware embodiments are also envisioned.

The apparatus 312 comprises an application processor subsystem 552 such as a digital signal processor, microprocessor, field-programmable gate array, or plurality of processing components mounted on one or more substrates 554. The processing subsystem may also comprise an internal cache memory. The processing subsystem is in data communication with a memory subsystem comprising memory which may for example, comprise SRAM 556, flash 558, and SDRAM 560 components. The memory subsystem may implement one or a more of DMA type hardware, so as to facilitate data accesses as is well known in the art.

The radio/modem subsystem comprises a digital baseband 562, analog baseband 565, RX frontend 566 and TX frontend 568. The apparatus 312 further comprises an antenna assembly 570 and duplex component 572; the duplexing component may comprise a simple switch 574 for switching between antenna operations. The switch 574 may also comprise a discrete component. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

In one embodiment, the M2M UE digital baseband modem 562 decodes a message from the UTRAN (e.g., initiated by the HLR), instructing the UE to perform any number of different tasks such as: (i) recalling and transmitting a stored template or configuration profile; (ii) change modes via a configuration assignment or template, which for example is stored in the memory of the M2M UE (or even may be transmitted with the UTRAN message as part of a packetized digital protocol); or (iii) implement other operational changes, such as sleep modes, retransmission schemes, slot assignments, etc. In one variant, the digital baseband modem fetches the configuration data or other stored information from the memory subsystem or decodes it from the UTRAN message. For example, transmission pattern configurations may be pre-stored in flash 558 for non-volatile storage and loaded to SDRAM 560 during modem operation. The template or restriction configurations are used by the digital baseband modem 562 in conjunction with the processor and its applications to appropriately schedule transmission and reception operation (e.g., when to transmit or request updates, how much data, etc.), or perform other functions as previously described herein.

The Analog Baseband 565 controls operation of the radio frontends and converts a digital signal (input from the digital baseband modem 562) to an analog representation for transmission. Therefore, the digital baseband modem 562 loads the analog baseband 565, with e.g., scheduling parameters for the upcoming frames. The duplexing component may include a simple switch 574 to the control of duplex operation or switch operation being controlled by the analog baseband 565. The control of TX and RX frontends are also controlled by the analog baseband 565.

The illustrated power management subsystem (PMS) 580 provides power to the UE, and may comprise an integrated circuit and or a plurality of discrete electrical components. In one exemplary M2M UE apparatus, the power management subsystem 580 advantageously interfaces with a battery 582. Alternatively, the interface may comprise the DC output of an AC voltage transformation and rectification circuit (not shown).

An optional user interface system 584 may also be provided (e.g., for reprogramming, setup, monitoring, etc.) and may comprises any number of well-known I/O including, without limitation: touch screen, LCD display, backlight, speaker, etc. However, it is recognized that in most applications, these components may be obviated. For example, PCMCIA card type M2M UE embodiments may lack a user interface.

The UE apparatus 312 further comprises optional additional peripherals 594 including, without limitation, one or more GPS transceivers, or network interfaces such as IrDA ports, Bluetooth transceivers, USB, FireWire, etc. It is however recognized that these components are not necessarily required for operation of the M2M UE in accordance with the principles of the present invention.

Network-Specified Operational Templates

In another aspect of the invention, the network operator can dictate or set usage patterns or templates which the M2M subscriber must follow. These may be for any number of purposes, including among others operational considerations (i.e., to force M2M traffic to underutilized times or portions of the network), or thwarting of fraud (such as where a rotating or changing pattern is used to avoid surreptitious users from identifying "acceptable" location update windows or the like and making use of them as well).

In another embodiment, at least a portion of the M2M users are required to perform calls or access requests in a patterned fashion so as to optimize network operation. For example, this pattern might comprise a stagger pattern, such that a first group or block of users is restricted to access (or update) within time period A, a second group during time period B, and so forth, thereby ostensibly spreading the M2M accesses/update requests more evenly over time. This approach advantageously leverages the fact that M2M devices are amenable to communication at literally any time of day or day of the week, since their communications are generally not time-specific (unlike human users, which typically need to make a call at a particular date and time).

In yet another embodiment, a substantially randomized pattern is employed by the network operator for call and/or update request accesses. In one embodiment, each subscriber M2M device is allocated (or capable of generating for itself) a random or pseudo-random code which indicates a randomized temporal window and a randomized interval or slot during that window. As a simple example, a given calendar day may be divided into 24 windows of one hour each, with each window divided into ten slots (of six minutes each). A binary code of 01011-0011 (hour-slot) could be randomly assigned to indicate the twelfth hour (01011) and the fourth slot (0011) for a given M2M subscriber, during which this M2M device would be able to conduct calls, location updates, etc. By virtue of random assignment, M2M subscribers of the network would be substantially equally divided into each of the available 240 daily slots (10 per hour, for 24 hours), so that accesses would be substantially equally distributed as well. This approach provides a "flat" or unshaped load balance for the network operator, which may be desirable in some cases. This approach could also be used as a heuristic mechanism for detecting comparatively large or gross fraud without having to monitor each device individually; i.e., if the network operator detects that the statistics for M2M accesses are skewed or depart from those expected for the randomized population, then further investigation would be conducted. As more and more M2M subscribers are added under this plan, the statistics would be "better" (i.e., less divergence), and hence large-scale fraud would become easier to detect. This randomized approach can also be rotated; i.e., new codes given out so often to some or all of the M2M clients, so as to frustrate surreptitious discovery and use of the codes.

Methods of Fraud Detection and Frustration

Figure 6A:
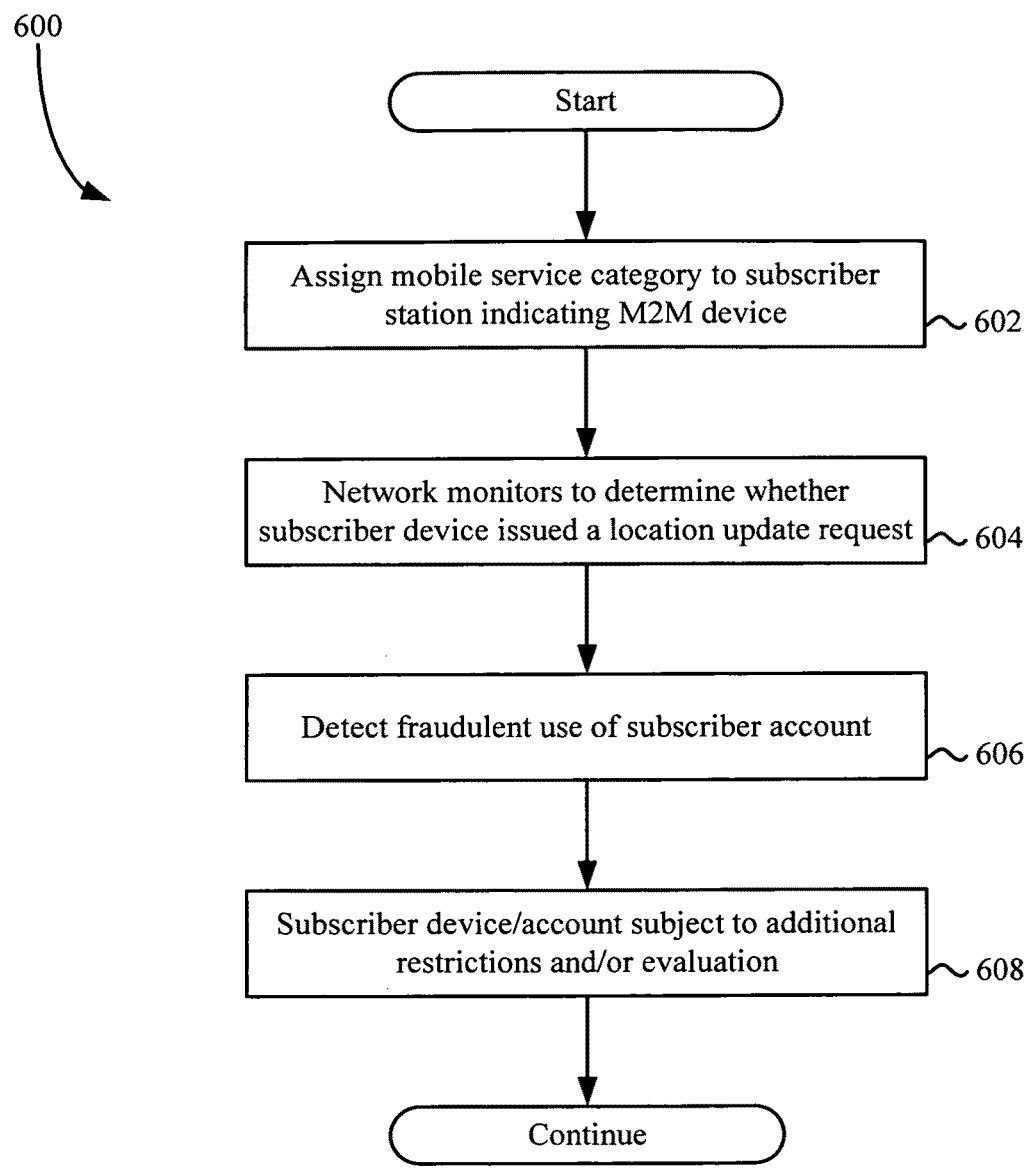
FIG. 6a is a logical flow diagram illustrating a generalized methodology for implementing fraud detection in a wireless network based on location update requests.

Referring now to FIG. 6a, one embodiment of the method of fraudulent use detection and prevention is disclosed. It will be appreciated that described in the context of a location update event, other operations or criteria indicative of fraudulent or surreptitious use of an M2M device/interface may be utilized in place or in conjunction with the location update event of FIG. 6a. For example, use not in accordance with one or more prescribed usage patterns established for a given M2M installation, or at volumes of data not consistent with the installed device, may indicate fraudulent use as well.

In this method 600, a given subscriber station (i.e., M2M device) is first assigned a mobile service category indicating that it is an M2M device (step 602).

Next, per step 604, the network periodically or anecdotally monitors to determine whether that subscriber device has issued a location update request. Such issuance of a location update for the M2M would tend to indicate that a fraudulent or unauthorized use of the M2M device was being made.

Per step 608, if such an ostensibly fraudulent use of the subscriber device was detected via the monitoring of step 604 (step 606), the subscriber device would be subject to additional restrictions and/or evaluation. For example, in one variant, all services to the potentially fraudulent device might be temporarily suspended until additional investigation was conducted. Such investigation might comprise for example running one or more analysis routines against the usage of the network by the device to identify inter alia irregular patterns or usage inconsistent with the know parameters or allowed services of the device (e.g., that obtained from the device file subsequently described herein).

Alternatively, services (or at least a subset thereof) may be continued uninterrupted, which may be necessary for certain "critical" applications (e.g., where service interruption could cause significant monetary loss or even present personnel safety issues), until additional investigation or analysis was performed by the network operator to determine if in fact the use was fraudulent. This analysis may also include geolocation of the offending device, such as via cellular triangulation using multiple base stations if available, or an indigenous GPS receiver on the device. This approach may also be useful for law enforcement purposes; i.e., to attempt to catch the thief in the act without "spooking" them by cutting off their surreptitious service.

Figure 6B:
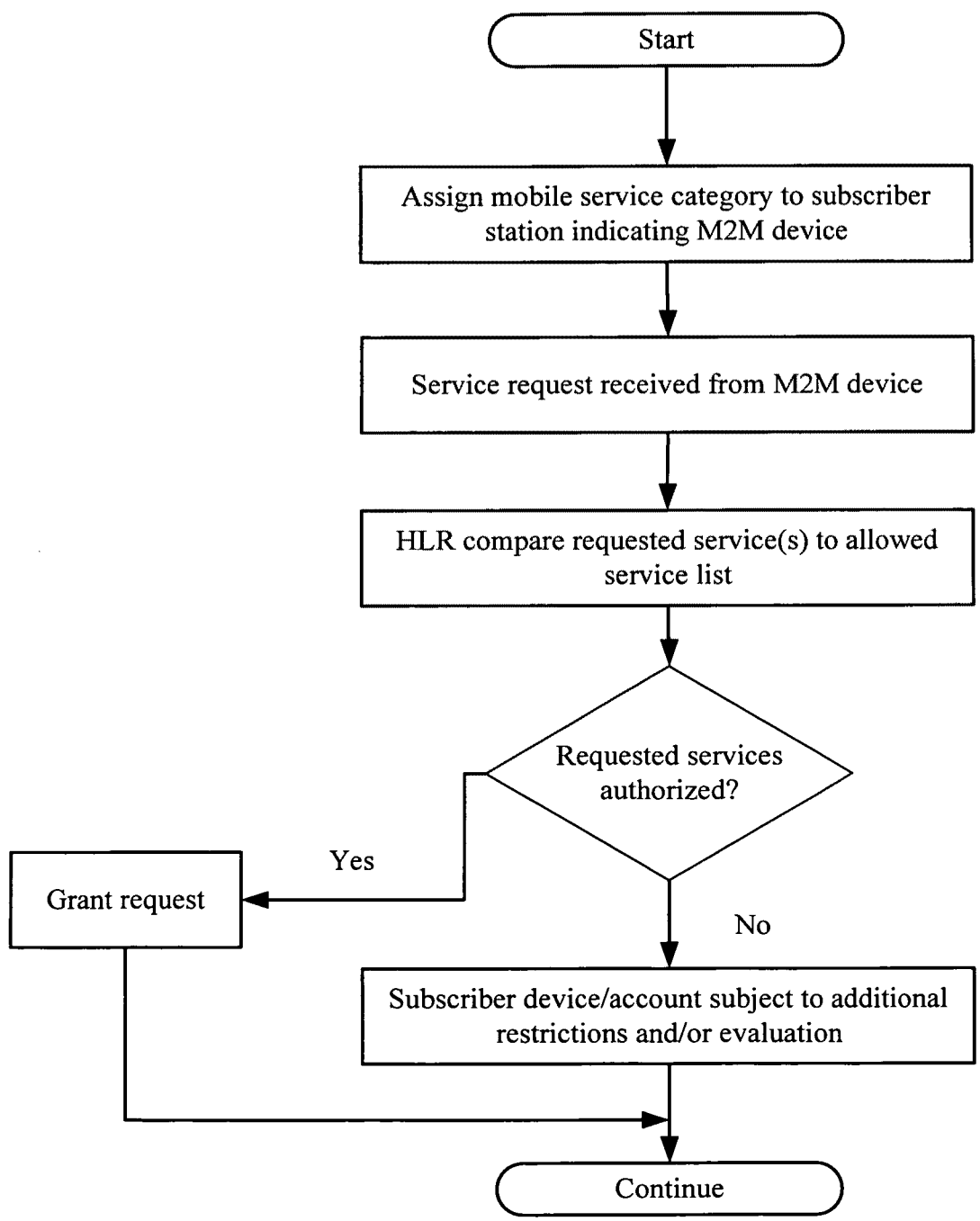
FIG. 6b is a logical flow diagram illustrating a generalized methodology for implementing fraud detection in a wireless network based on requests for unauthorized services.
Figure 4:
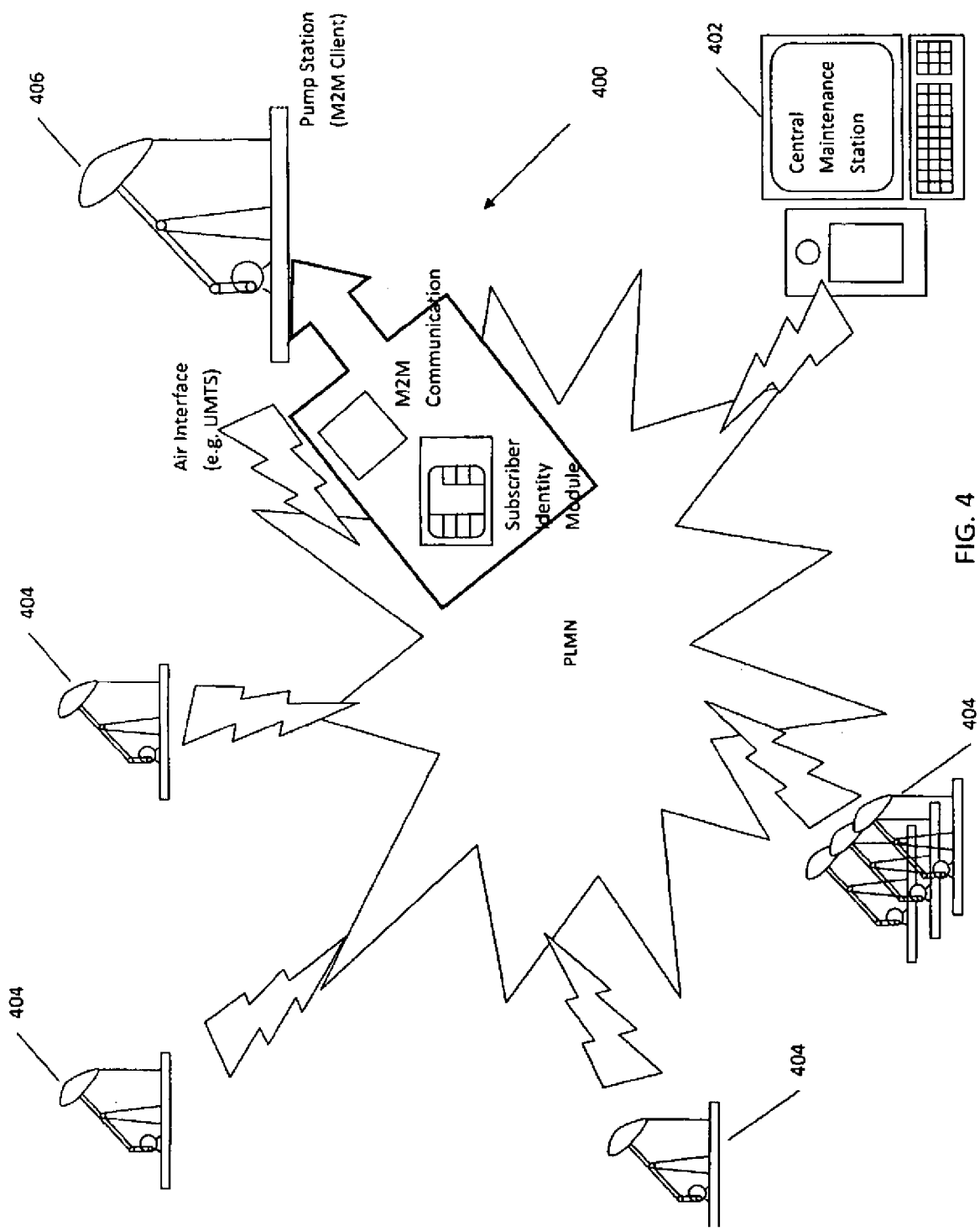
Figure 4:
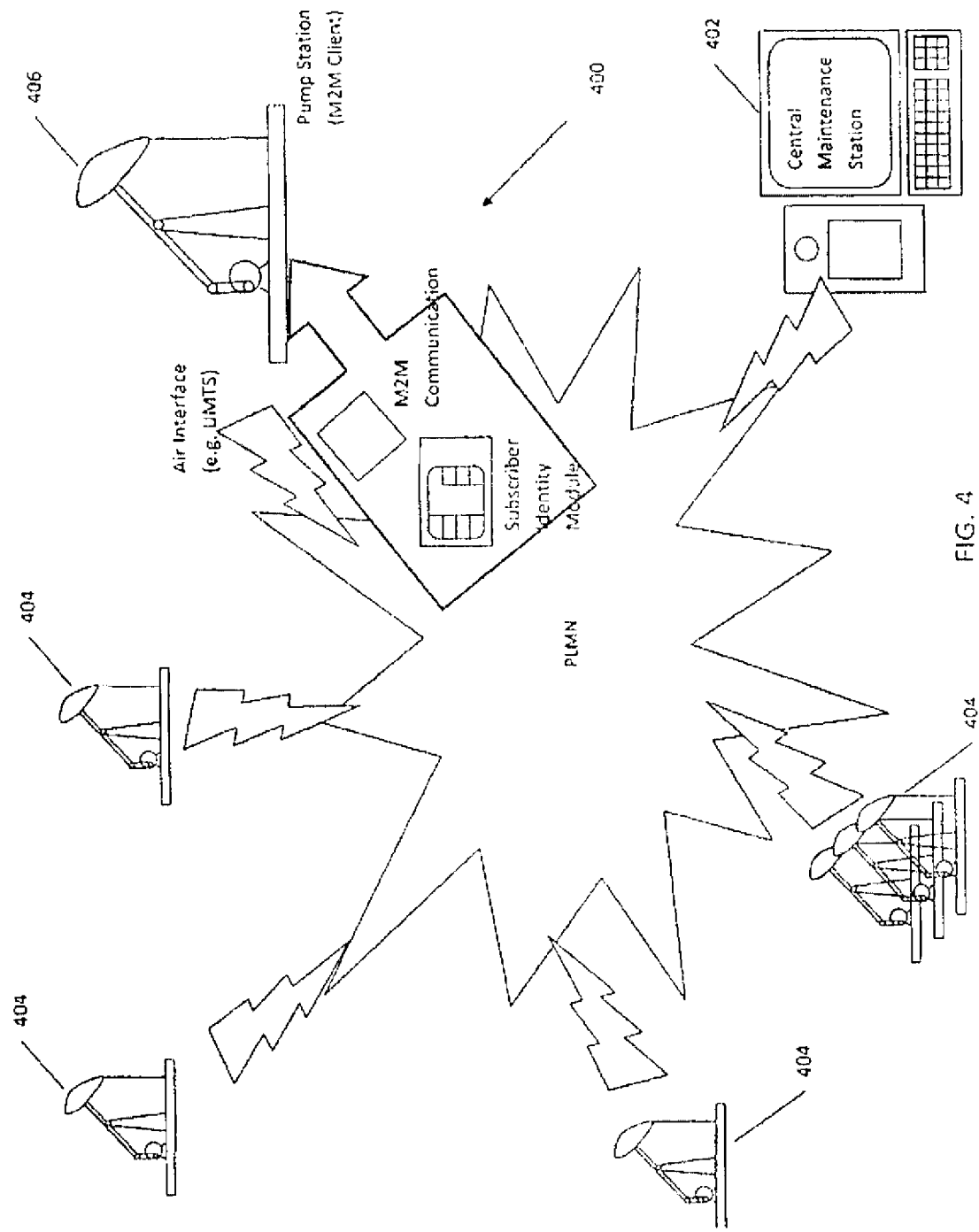

As another example (see FIG. 6b), a compromised M2M client would detectably behave in a manner dissimilar to its legitimate usage or services. This fast detection would advantageously be aided by the HLR knowing beforehand the services which the M2M client is intended to use, further minimizing the potential danger of corruption.

It will also be recognized that various network security features or techniques may be employed consistent with the invention so as to frustrate fraudulent use or service theft. For example, well known encryption algorithms (e.g., AES/DES, block ciphers, etc.) and symmetric or asymmetric authentication mechanisms (e.g., public/private key pairing, challenges, passwords, etc.) can be used, on top of those mandated by the underlying bearer wireless network, for data transmitted to or from the M2M clients. One such user "restriction" might comprise for example that all data be sent using a prescribed public/private key pair; that way, any data sent which is unencrypted or not accessible using this key pair can be identified as ostensibly fraudulent.

Automatic Subscriber Device Capability Detection and Evaluation

Referring now to FIG. 7, one embodiment of the method of automatic capability detection and categorization of an M2M wireless device is disclosed.

In the embodiment of FIG. 7, the method 700 comprises first establishing service for a subscriber or user M2M device within the network (step 702).

Next, per step 704, the network (e.g., HLR or its proxy) determines whether an "active" or "passive" evaluation of the M2M device is to be conducted. In the case of an active determination, the HLR or proxy causes a query to be issued to the M2M device or other information source (e.g., database maintained by the network operator) for information regarding the M2M device configuration and/or use (step 706). In one variant, the M2M or database maintains a capabilities profile (e.g., stored in ROM or other memory), which may be entered by the manufacturer, installer or even user of the M2M device. This profile may be distinct from that previously described (i.e., the 3GPP TS 23.008 subscriber profile), or may be wholly or partly integrated therewith if desired under certain embodiments. This capabilities profile describes the operating parameters of the device (e.g., maximum data rate, programmed periodicity of use if any, mobility or need for any location updates, etc., as well as the services the device is authorized to access) which are useful to the network operator in evaluating the M2M for any number of purposes including inter alia those described with respect to FIGS. 6a and 6b herein, as well as operational planning within the network (e.g., scheduling of capacity, maintenance functions, etc.).

Upon receipt of the query, the M2M or other entity returns the requested profile data via the wireless uplink or other available transport (step 708), wherein the HLR or its proxy stores and/or evaluates the data (step 710).

Alternatively, under the passive approach, the HLR or proxy institutes monitoring of the M2M device (step 712) in question in an attempt to determine its capabilities and/or operating parameters. For example, in one variant, the M2M device is monitored for a prescribed period of time (e.g., 12 hours, a day, a week, etc.) until sufficient data; i.e., number of M2M communication events, is established so that the operating parameters and capabilities of the device can be divined. For instance, a monitoring period's worth of data might yield a highly regular network access pattern, no location updates, and very low bandwidth requirements for the upstream (M2M to network) link.

Accordingly, the present invention further contemplates the use of sub-classifications within the "M2M" subscriber class previously described, so that different types of M2M applications can be identified and classified (thereby allowing for different treatment of each within the network if desired). For instance, one such sub-classification scheme might create two sub-classes; i.e., Mobile M2M (e.g., for M2M devices that are periodically moved by nature of their use), and Non-mobile M2M (fixed devices). Those devices in the former category would not be screened based on location update requests (as previously described herein), whereas those in the latter category could be screened in this fashion.

Other such sub-classification schemes might comprise "high bandwidth" versus "low bandwidth", classification by location (e.g., by geographic cell number or ID), and so forth.

By sub-classifying the various M2M devices on the network, operational or business "templates" can be applied which govern the treatment of the various types of devices and/or applications (either on an individual or collective basis). This approach advantageously obviates the need to treat each M2M device as sui generis; rather, all devices can be classified and treated according to predetermined rule sets. For example, devices which require location updates might be treated differently (e.g., told to perform their location updates at a prescribed time of day, or after a certain prescribed event occurs, so as to frustrate attempts at service theft, or to coincide with an operational "lull" in the network) than those which do not require such updates. Similarly, application-based templates for say mobile ATM machines and oil pumping stations may be established for use by the network. Myriad different permutations and combinations of applications and operational/business rules that can be applied using this aspect of the invention will be readily appreciated by those of ordinary skill provided the present disclosure.

It will be noted that the aforementioned operational/business templates are similar to those previously described, with the salient distinction being that the operational/business templates of FIG. 7 are also useful in classifying subscriber devices. For instance, an operational pattern exhibited by a given device would allow it to be classified as a certain type of device (e.g., non-mobile soft drink machine), and a set of rules adapted for that application applied, whereas the templates previously described may be applied irrespective of device type (e.g., all devices, irrespective of type, must restrict their network accesses to time slots specified by their randomized code). Clearly, the two types of templates can also interact or be part of unified template structure if desired.

Referring back to FIG. 7, at step 714, the monitoring data when collected is then used to (sub)classify the M2M device in question. One or more rule sets are then applied based on this sub-classification (not shown).

Capabilities monitoring and evaluation by the network under the present invention can also be of a more sophisticated nature. For example, under the passive approach described above, the monitoring HLR or proxy could implement an algorithm which evaluates the statistics of a given device (e.g., the timing, duration, and/or data bandwidth used or total data transmitted), and uses this in conjunction with similar data obtained from other M2M-classfied devices for network planning purposes. Say, for instance, that all M2M devices monitored are normally (Gaussian) distributed in terms of one or more of the foregoing monitored parameters, such that most devices fall mostly within a certain range of use times, durations, and/or data usages (e.g., the majority fall within one sigma ($\sigma$) of the mean for that parameter). This type of information can be used by the network operator for inter alia capacity scheduling or other such considerations. Knowing for instance that most M2M transactions will take between X and Y seconds to complete may allow the operator to further fine-tune or optimize its network in terms of its underlying parameters.

Similarly, knowing that many of the M2M call requests will occur at certain periods of the day, or conversely that they will be spread out somewhat evenly over time, is also potentially useful information. For example, in the case of the latter, the network operator can allocate resources that are less than what a "peak demand" model might indicate; i.e., one where the worst case of all subscribed M2M devices overlapping their communications in time, since the anecdotal statistics obtained from the network indicate a more even distribution.

Business Methods

In a first exemplary aspect, business methods are implemented which adjust pricing to subscribers based on a mobile station category identifier. In one exemplary embodiment, these identifiers include whether or not a user comprises an ordinary subscriber or an M2M subscriber. In a variant of this first embodiment, additional pricing adjustments can be made based on network access restrictions that are acceptable to the operator of an M2M subscriber. This may also comprise a "tiered" pricing model with more/larger adjustments as more restrictions are obeyed. For example, a price break could be given to an M2M subscriber based on whether or not the subscriber can accept limitations with regards to: (i) accessible dates and times for network services; (ii) traffic volume restrictions; (iii) data amount restrictions; (iv) the ability to make incoming or outgoing calls; (v) the ability to make human calls (e.g., service-related calls or maintenance requests) along with M2M call support; (vi) the quality-of-service (QoS) guarantees required; etc.

In yet another variant, additional pricing adjustment can be given to an M2M subscriber based on whether or not the customer wishes to share a unique identifier (e.g. an IMSI) across multiple M2M clients.

It will be appreciated from the foregoing disclosure that the entire range of M2M device capabilities and/or "intelligence" can be employed consistent with the invention. Specifically, a comparatively "dumb" M2M client can be used, wherein the device can only transmit limited amounts or types of data according to a prescribed schedule, and with no ancillary feature support or configuration change capability. Alternatively, highly capable M2M devices with transmission and reception capability, remote configuration change/update capability, troubleshooting algorithms, and even network access and analysis algorithms may be employed. Hence, in another aspect of the invention, the business model for use of M2M services comprises provision by the network operator of pre-approved or "certified" M2M devices to subscribers. Much as a cable system operator provides set top boxes to its subscribers that are provisioned for optimal use with the network operator's particular network, the cellular network operator under the present model can provide M2M devices which have varying feature sets that are particularly adapted for the intended application(s). For instance, if the intended application for a given subscriber is a non-mobile "dumb" application requiring very little in the way of functionality, a minimal or "thin" M2M UE can be provided.

Alternatively, where the applications and need for flexibility become more sophisticated, a more capable device (e.g., with remote reconfigurability, stored configuration data, stored operational templates, error logging and retrieval capability, etc.) can be provided. This aspect can also be coupled to the rate structure previously described, such as where a subscriber would be given a better rate for use of a "dumb" device versus that for one with greater capabilities/intelligence.

Yet other business models are envisaged, including without limitation: (i) a rate structure wherein large users are given "volume discounts" when their subscription (e.g., number of devices serviced) exceeds a given threshold; (ii) where subscribers allow the network operator to manage or control the timing and other aspects of the operation of their M2M device(s) in exchange for rate preferences or other consideration; (iii) wherein subscriber's can "sell back" or rollover their unused minutes allocated to M2M uses (e.g., where the subscriber's M2M application requires only comparatively infrequent network access), (iv) rewards or other consideration for aiding the network operator in detecting and stopping fraud or surreptitious use, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for operating a wireless network, comprising:
   receiving a wireless service request message from a client device;
   determining, based on profile information associated with the client device, whether the client device is associated with a station category selected from a group of station categories that includes at least:
   a first station category that corresponds to an ordinary subscriber, and
   a second station category that corresponds to an automated apparatus subscriber,
   wherein the profile information is derived from monitoring a pattern of activity of the client device for a predetermined period of time;
   upon determining that the client device is associated with the second station category, assigning the second station category to the client device; and
   implementing a plurality of operating rules that are based on the second station category and restrict a manner in which the wireless service is provided to the client device.

2. The method of claim 1, wherein at least one operating rule of the plurality of operating rules restricts the client device from performing a location update.

3. The method of claim 1, further comprising determining whether the client device has issued a location update request.

4. The method of claim 1, wherein at least one operating rule of the plurality of operating rules restricts the client device's access to the wireless service based at least in part on a temporal parameter.

5. The method of claim 4, wherein the at least one operating rule restricts a number or a volume of data traffic communicated with the client device.

6. The method of claim 4, wherein the at least one operating rule allows data traffic to be initiated by the client device only during certain prescribed windows of time.

7. The method of claim 4, wherein the at least one operating rule restricts data traffic initiated by the client device to a certain amount per a particular unit of time.

8. The method of claim 1, wherein at least one operating rule of the plurality of operating rules restricts data traffic with the client device to a maximum value.

9. The method of claim 1, wherein at least one operating rule of the plurality of operating rules restricts the client device's access to the wireless network based on a network traffic parameter.

10. The method of claim 9, wherein the network traffic parameter specifies an amount of data traffic that is permitted to pass through a source cell.

11. The method of claim 9, wherein the network traffic parameter specifies an amount of data traffic that is permitted to pass through a target cell.

12. The method of claim 1, wherein the wireless network comprises a Universal Mobile Telecommunications System (UMTS) cellular network.

13. A non-transitory computer-readable storage medium adapted to store a computer program, wherein the computer program, when executed by a processing device, causes the processing device to carry out steps that include:
    receiving a wireless service request message from a client device;
    determining, based on profile information associated with the client device, that the client device corresponds to an automated apparatus user type, wherein the profile information is derived from monitoring a pattern of activity of the client device for a predetermined period of time;
    assigning the automated apparatus user type to the client device, wherein the automated apparatus user type is one of a plurality of user types that are different from one another;
    implementing a set of operating rules for the client device wherein the set of operating rules is based at least in part on the automated apparatus user type;
    determining that a violation of an operating rule from the set of operating rules has occurred and flagging the violation as a potential fraud; and
    imposing connectivity restrictions on the client device wherein the set of operating rules.

14. The non-transitory computer-readable storage medium of claim 13, wherein the set of operating rules comprises a first operating rule that governs an operation of outgoing calls from the client device, and a second operating rule that governs an operation of incoming calls to the client device.

15. The non-transitory computer-readable storage medium of claim 13, wherein the set of operating rules comprises an operating rule that restricts the client device from accessing the wireless service based on a time parameter.

16. The non-transitory computer-readable storage medium of claim 13, wherein at least one operating rule in the set of operating rules restricts data traffic with the client device to a maximum value.

17. The non-transitory computer-readable storage medium of claim 13, wherein at least one operating rule in the set of operating rules restricts the client device's access to the wireless service based on a network traffic parameter.

18. The non-transitory computer-readable storage medium of claim 17, wherein the network traffic parameter specifies an amount of data traffic that is permitted to pass through a source cell or a target cell.

19. The non-transitory computer-readable storage medium of claim 13, wherein at least one operating rule in the set of operating rules restricts data traffic initiated by the client device to a fixed amount per a unit of time.

20. The non-transitory computer-readable storage medium of claim 13, wherein the wireless service is provided by a cellular wireless network compliant with Universal Mobile Telecommunications System (UMTS), and the automated apparatus user type comprises a machine-to-machine (M2M) user type.

21. The non-transitory computer-readable storage medium of claim 13, wherein the profile information is stored by a wireless network that provides the wireless service, and is at least partly constructed based on anecdotal observations of the pattern of activity of the client device.

22. The non-transitory computer-readable storage medium of claim 13, wherein the computer program, when executed by a processing device, further causes the processing device to carry out a step that involves causing the client device to perform location updates only during one or more prescribed periods of time.

23. An apparatus for use in a wireless network, comprising:
a digital processor;
at least one network interface in data communication with the digital processor; and
a memory storing at least one computer program, wherein the at least one computer program includes instructions that are configured to comprising instructions which when executed by the digital processor, cause the apparatus to:
receive a wireless service request message from a client device;
monitor a pattern of activity of the client device for a predetermined period of time to derive profile information associated with the client device;
determine, based on the profile information associated with the client device, whether the client device is associated with a station category selected from a group of station categories that includes at least:
a first station category that corresponds to an ordinary subscriber, and
a second station category that corresponds to an automated apparatus subscriber;
upon determining that the client device is associated with the second station category, assign the second station category to the client device; and
implement a plurality of operating rules that are based on the second station category and restrict a manner in which the wireless service is provided to the client device.

24. The apparatus of claim 23, wherein the wireless network comprises a Universal Mobile Telecommunications System (UMTS) wireless network, and the apparatus comprises a home location register (HLR) apparatus.

25. The apparatus of claim 23, wherein at least one operating rule of the plurality of operating rules is intended to facilitate detection of surreptitious use or service theft on an account associated with the client device.

26. A method for operating a wireless network, the method comprising:
receiving a wireless service request message from a client device;
determining, based on profile information associated with the client device, that the client device corresponds to an automated apparatus user type, wherein the profile information is derived from monitoring a pattern of activity of the client device for a predetermined period of time;
assigning the automated apparatus user type to the client device, wherein the automated apparatus user type is one of a plurality of user types that are different from one another;
implementing a set of operating rules for the client device, wherein the set of operating rules is based at least in part on the automated apparatus user type; and
determining that a violation of an operating rule from the set of operating rules has occurred and flagging the violation as a potential fraud; and
restricting data traffic with the client device to a maximum value.

27. The method of claim 26, wherein the network comprises a Universal Mobile Telecommunications System (UMTS) wireless network.

28. The method of claim 26, wherein at least one operating rule in the set of operating rules is intended to facilitate detection of surreptitious use or service theft on an account associated with the client device.

29. The method of claim 26, wherein the set of operating rules includes an operating rule that restricts the client device from accessing the wireless service based on a time parameter.

30. The method of claim 26, wherein the set of operating rules comprises an operating rule that restricts the client device from accessing the wireless network based on a network traffic parameter.

31. The method of claim 30, wherein the network traffic parameter comprises an amount of data traffic that is allowed to pass through one of a source cell or a target cell.

32. A method for governing an operation of a client device in a wireless network, comprising:
receiving a wireless service request message from the client device;
determining, based on profile information associated with the client device, that the client device corresponds to an automated apparatus user type, wherein the profile information is derived from monitoring a pattern of activity of the client device for a predetermined period of time;
assigning the automated apparatus user type to the client device, wherein the automated apparatus user type is one of a plurality of user types that different from one another;
implementing a set of operating rules for the client device, wherein the set of operating rules is based at least in part on the automated apparatus user type;
determining that a violation of an operating rule from the set of operating rules has occurred and flagging the violation as a potential fraud; and
imposing connectivity restrictions on the client device.

33. The method of claim 32, wherein the set of operating rules comprises at least one operating rule that governs an operation of outgoing calls from the client device, and at least one operating rule that governs an operation of incoming calls to the client device.

34. The method of claim 32, wherein at least one of the operating rules in the set of operating rules restricts data traffic initiated by the client device to a fixed amount per a unit of time.

35. The method of claim 32, wherein the wireless network comprises a cellular wireless network compliant with Universal Mobile Telecommunications System (UMTS), and the automated apparatus user type comprises a machine-to-machine (M2M) user type.

\* \* \* \* \*

UNITED STATES PATENT AND TRADEMARK OFFICE
CERTIFICATE OF CORRECTION

| | | |
|---|---|---|
| PATENT NO. | : 8,737,989 B2 | Page 1 of 2 |
| APPLICATION NO. | : 12/231095 | |
| DATED | : May 27, 2014 | |
| INVENTOR(S) | : Achim Luft et al. | |

It is certified that error appears in the above-identified patent and that said Letters Patent is hereby corrected as shown below:

In Drawings:

FIG. 4 of the issued patent should be replaced with Sheet 6, FIG. 4. (attached)

In Claims:

Claim 13, lines 22-23: "client device wherein the set of operating rules." should read --client device.--.
Claim 23, lines 7-8: "to comprising instructions which when executed" should read --to, when executed--.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,737,989 B2 | |
| APPLICATION NO. | : 12/231095 | |
| DATED | : May 27, 2014 | |
| INVENTOR(S) | : Achim Luft et al. | |

It is certified that error appears in the above-identified patent and that said Letters Patent is hereby corrected as shown below:

In Drawings:

FIG. 4 of the issued patent should be replaced with Sheet 6, FIG. 4. (attached)

In Claims:

Column 24, lines 51-52, Claim 13, "client device wherein the set of operating rules." should read --client device.--.
Column 25, lines 34-35, Claim 23, "to comprising instructions which when executed" should read --to, when executed--.

This certificate supersedes the Certificate of Correction issued November 11, 2014.

Signed and Sealed this
Ninth Day of December, 2014

Michelle K. Lee
*Deputy Director of the United States Patent and Trademark Office*